United States Patent [19]

Tsunekawa et al.

[11] 4,280,151

[45] Jul. 21, 1981

[54] HIGH SPEED IMAGE RECORDING SYSTEM

[75] Inventors: Tokuichi Tsunekawa; Toshio Sakane, both of Yokohama; Tatsuya Taguchi, Tokyo, all of Japan

[73] Assignee: Canon Kabushiki Kaisha, Tokyo, Japan

[21] Appl. No.: 13,364

[22] Filed: Feb. 21, 1979

[30] Foreign Application Priority Data

Feb. 24, 1978 [JP] Japan .................................. 53-20658
Mar. 27, 1978 [JP] Japan .................................. 53-35672
Mar. 27, 1978 [JP] Japan .................................. 53-35673

[51] Int. Cl.$^3$ ............................................. H04N 5/78
[52] U.S. Cl. ........................................... 360/33; 360/9
[58] Field of Search ................. 360/9, 10, 33, 35, 22, 360/23; 358/22, 127, 140, 151, 212, 213, 296, 298, 302, 283, 285

[56] References Cited

U.S. PATENT DOCUMENTS

| | | | |
|---|---|---|---|
| 2,897,264 | 7/1959 | Deuth | 358/285 |
| 3,504,119 | 3/1970 | Baldwin | 360/10 |
| 3,911,467 | 10/1975 | Levine et al. | 358/213 X |
| 3,975,764 | 8/1976 | Kobayashi et al. | 360/23 |
| 4,074,324 | 2/1978 | Barrett | 358/296 |
| 4,131,919 | 12/1978 | Lloyd et al. | 360/9 |
| 4,149,091 | 4/1979 | Crean et al. | 358/285 X |

OTHER PUBLICATIONS

Mayes et al., "High-Speed Image Capture for Mechanical Analysis", IBM Tech. Disc. Bul., vol. 16, No. 7, 12-73, pp. 2169-2171.

Primary Examiner—Bernard Konick
Assistant Examiner—Donald McElheny, Jr.
Attorney, Agent, or Firm—Toren, McGeady and Stanger

[57] ABSTRACT

A magnetic image recording system in which an image is electrically scanned to obtain a video signal and this is magnetically recorded on a magnetic recording medium. According to improvements of the present invention, for the image scanning means, use is made of a two-dimensional arrangement of a plurality of photosensitive elements and further of a self-scanning type solid-state image sensing device constructed so as to be capable of simultaneously reading out image scanning signals from the individual lines of the two-dimensional arrangement. With this solid-state image sensing device, in scanning an image, it is, for example, the individual odd number lines in the aforesaid two-dimensional arrangement that at first produce image scanning signals based on which the video signal is obtained. Then the video signal is recorded as an odd number field signal on the recording medium through a multi-head. Then, another video signal obtained by image scanning signals from the individual even number field signal is recorded on the recording medium through the multi-head. Compared with conventional systems in which horizontal field lines are sequentially scanned and recorded, all of the horizontal video scan line signals which constitute an entire field are simultaneously recorded in the present system. In other words, in contrast to conventional systems wherein images are recorded and played back at a rate of, for example, 60 fields per second, the system of the present invention enables a substantially greater number of fields to be recorded each second so that when the recorded fields are played back at a conventional rate, i.e., 60 fields per second, a substantial "slow motion" reproduction can be obtained.

17 Claims, 66 Drawing Figures

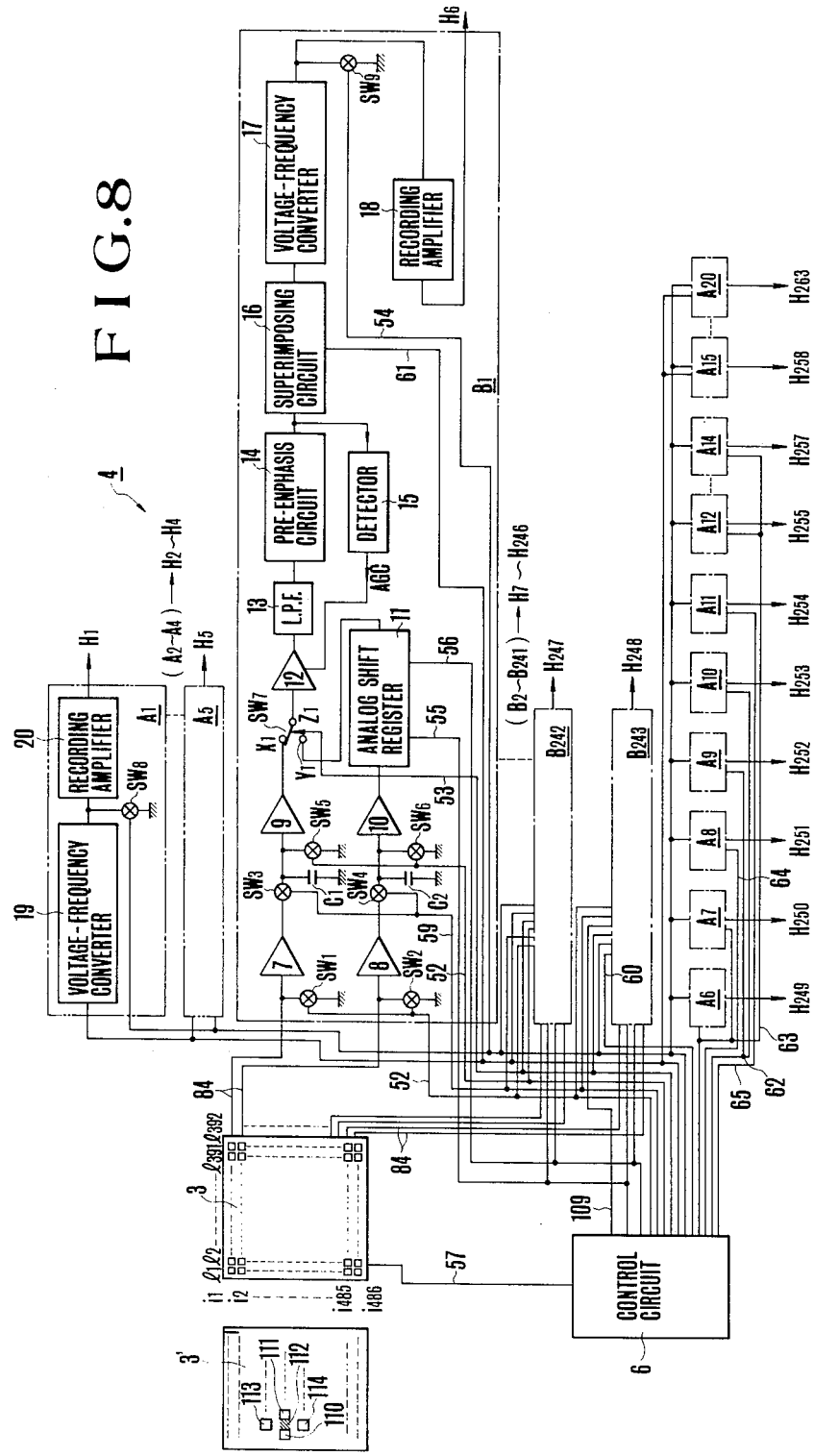

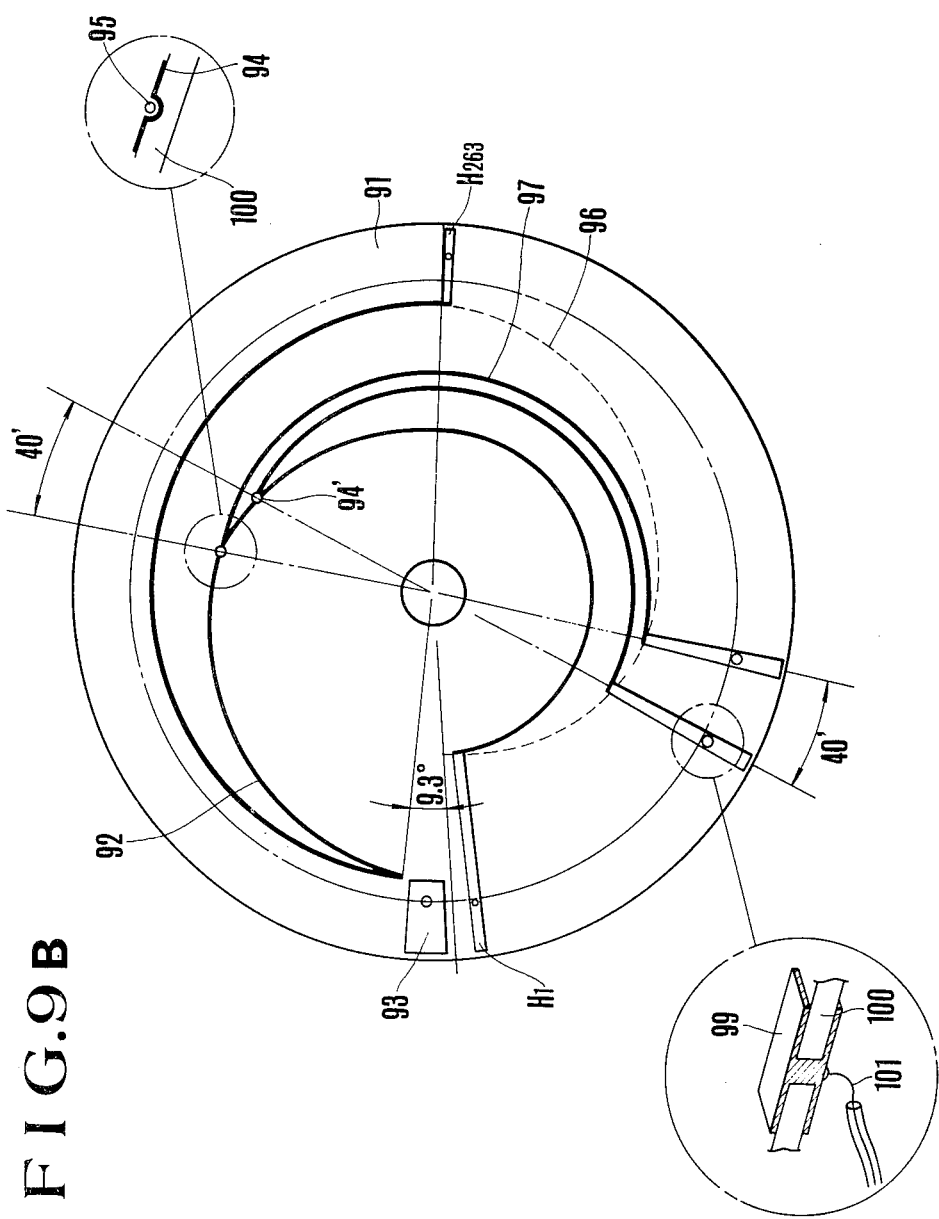

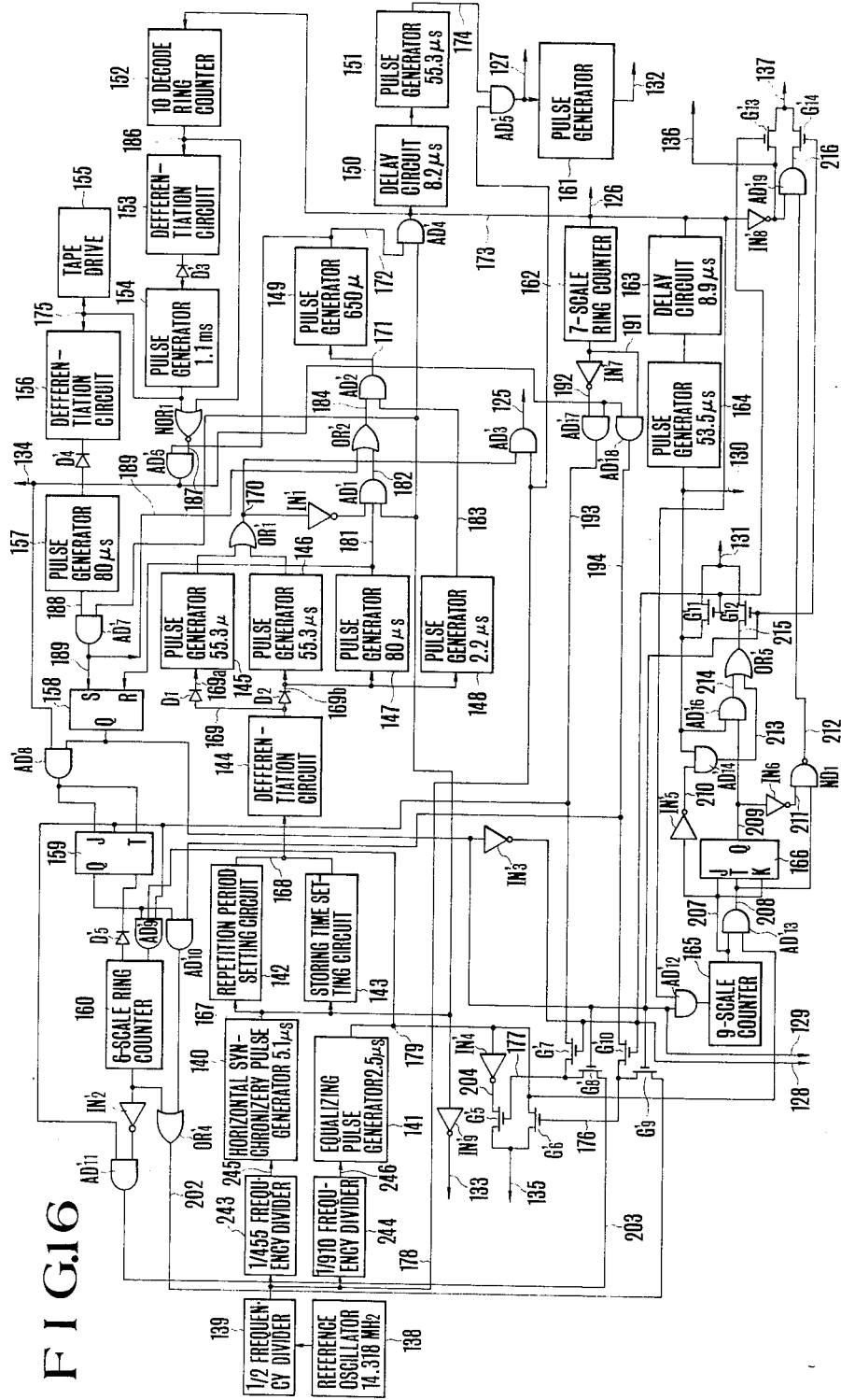
F I G. 16

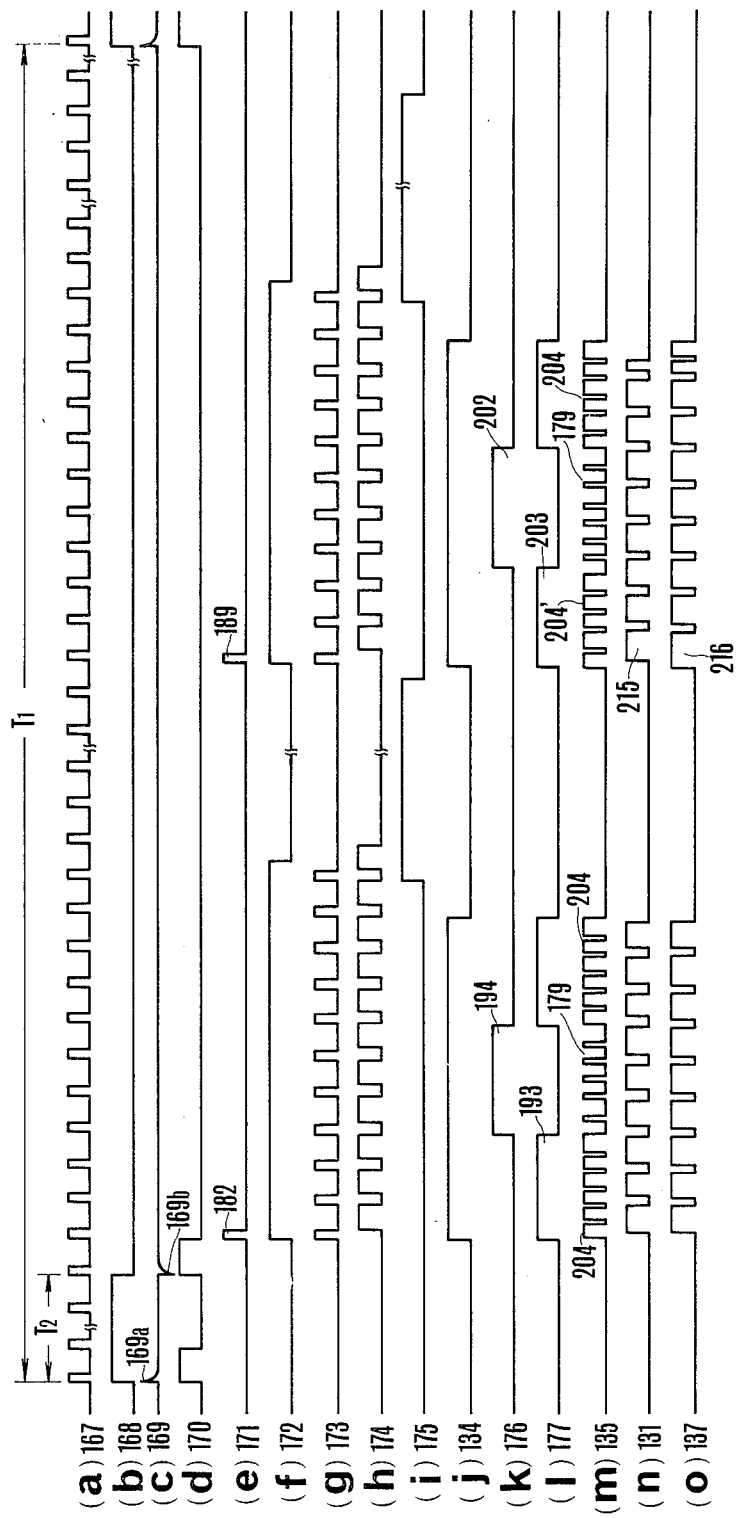

HIGH SPEED IMAGE RECORDING SYSTEM

BACKGROUND OF THE INVENTION

1. Field of the Invention

This invention relates to magnetic image recording and reproducing systems, and more particulary to a high speed video system using a self-scanning type solid-state image sensing device as the image scanning means.

2. Description of the Prior Art

For use as the high speed video system for taking images of high speed phenonmena which are later reproduced at an ordinary speed to obtain slow motion images on projection, it is known to provide a system where the images taken at a high speed by using a cinematographic film while being reproduced at an ordinary speed are transferred to a magnetic recording medium, and the image signals recorded on this recording medium are reproduced at an ordinary speed, or a system which utilizes a slow VTR of the magnetic recording-reproducing method, or a video disc. The former system has certain disadvantages. First, because of its use of the method of transferring the images from the cinematographic film to the magnetic recording medium, the handling is very troublesome. Second since the picture taking speed of the cinematographic camera is limited, it is impossible to obtain a slow motion effect of greater than 2 or 3 times. On the other hand, the latter system permits high speed scanning of the target surface of an image pick-up tube of a video camera, or high speed recording through a video disc after which these are scanned at an ordinary speed to reproduce a slow motion video image on the fluorescent surface of the C.R.T. According to this method, however, it is required for the magnetic head to scan the magnetic recording surface of the VTR or video disc at a high speed. Therefore, the mechanical accuracy of the recording and reproducing apparatus gives rise to a problem. Further, this method is accepted only in high speed video, systems where the magnification rate is comparatively low. It has so far been difficult to achieve the recording and reproducing of phenomena with more than a factor of ten in speed variation.

SUMMARY OF THE INVENTION

With the foregoing in mind, the present invention as applied to a high speed video system in which a high speed phenomenon is recorded as images which are later reproduced at an ordinary speed to effect a slow motion imaging, has for its general object to entirely eliminate all the conventional drawbacks such as the troublesome handling due to the use of cinematographic film and the requirements of high speed scanning of the target surface of an image pick-up tube, or of high speed scanning by the magnetic head and to provide a novel and more beneficial magnetic image recording system capable of a large increase in the image recording speed as compared with the method known in the art.

To achieve this object, according to the present invention, for the image scanning means, use is made of a self-scanning type solid-state image sensing drive having a two-dimensional arrangement of a plurality of photo-sensitive elements and constructed so as to be capable of simultaneously reading out image scanning signals from the individual lines of that two-dimensional arrangement. Thus, the line scanning signals obtained when scanning an image with the aforesaid solid-state image sensing device are converted through respective processing circuits into a video signal which is then fed to a multi-head for recording the aforesaid video signal on a magnetic recording medium.

With such a magnetic image recording system, particularly because of its permitting the simultaneous production of all the line-scanning signals from the above-identified solid-state image sensing device, it is possible to speed up the image recording by a far larger extent then the conventional image recording system whose image sensing aspect is of the X-Y address type, line address type, frame transfer type, or interline transfer type. In addition to the entire elimination of all the problems which would otherwise arise from the use of cinematographic film and the necessity of high speed scanning of the target surface of the image pick-up tube, or of using the magnetic head in high speed scanning, it is, therefore, possible to achieve an increase in the recording speed of several hundreds of times, for example.

It is noted that the above-identified self-scanning type solid-state image sensing device of the invention used as an image scanning means may be considered to be constructed as a row of a great number of linear array type image sensors known in the art. Such construction may be otherwise conceived of as derived from the X-Y address type solid-state image sensing device by removing its Y-direction address means, or from the line address type solid-state image sensing device by removing its vertical scanning circuit, or from the frame transfer type or the interline transfer type solid-state image sensing device by removing its horizontal-direction transfer analog shift register so that the scanning signals of the individual lines can be obtained simultaneously.

An object of the present invention is to provide a high speed image recording system capable, upon cooperation with a standard television system employing the interlaced scanning, of recording the odd-numbered and even-numbered lines in each field in an individual area on the recording medium at a high speed.

To this end, according to one embodiment of the present invention, the image recording system is constructed so that the two scans of the above-described solid-state image sensing device are paired upon the first scan to supply image-scanning signals from, for example, only the individual odd-numbered lines to respective processing circuits whose outputs as the odd-numbered field signal are recorded on a recording medium. Upon the second scan, image-scanning signals from only the even-numbered lines are fed to the above-identified processing circuits whose outputs as the even-numbered field signal are then recorded on the above-identified recording medium. Thus, the odd-numbered and even-numbered fields can be alternately recorded at high speed.

According to another embodiment of the present invention, with the above-described solid-state image sensing device when in scanning an image, it occurs that while the image-scanning signals from the odd-numbered lines are, for example, at first fed to the processing circuits, and the concurrent outputs of these processing circuits are recorded as the odd-numbered field signal on the recording medium, the concurrent image-scanning signals from the individual even-numbered lines are stored on a suitable means such as analog shift register. After completing the recording of the odd-numbered field signal the signals from the even numbered lines are transferred from the above-identified storing means to the above-identified processing circuits whose outputs are then recorded at this time as the even-numbered field signal on the above-identified recording medium. Thus, the odd-numbered and even-numbered field signals can be alternately recorded at high speed.

Another object of the present invention as adapted for recording images by the 2 field-1 frame method is to reduce the number of line sensors in the above-described solid-state image sensing device to as small a value as possible.

To this end, according to a further embodiment of the present invention, with the above-described solid-state image sensing device when scanning an image, the image-scanning signals from the individual lines are fed to the respective processing circuits which have outputs thereof recorded at this time as a first field signal on a recording medium, while the same image-scanning signals from the individual lines are simultaneously stored on storing means. After the recording of the first field signal has been completed, the stored image-scanning signals are transferred to the above-identified processing circuits whose outputs are recorded at this time as a second field signal on the above-identified recording medium. Thus, one form of the image recording system is proposed where the number of line sensors in the above-described solid-state image sensing device is reduced to, for example, ½ times that at which the 2 fields-in-1 frame type high speed image recording can be performed.

Still another object of the present invention is to reduce the number of head elements in the above-described recording multi-head and the corresponding number of processing circuits to as small a value as possible.

According to a furthermore embodiment of the present invention, the above-described solid-state image sensing device is provided with a plurality of odd-numbered line signal storing means for grouping and storing the image-scanning signals from a plurality of different odd-numbered lines and with a plurality of even-numbered line signal storing means for grouping and storing image-scanning signals from a plurality of different even-numbered lines, whereby it is, for example, the odd-numbered line signal storing means that are at first rendered effective to feed the processing circuits with the image-scanning signals therefrom, and the concurrent outputs of said processing circuits lead to an odd-numbered field signal which is recorded on a recording medium. The even-numbered line signal storing means are then rendered effective to feed the above-identified processing circuits with the image-scanning signals therefrom. The concurrent outputs of said processing circuits lead to an even-numbered field signal which is recorded on the above-identified recording medium. Thus, one form of the image recording system is proposed where high speed image recording can be performed with a decreased number of recording heads and processing circuits.

The present invention has been described in connection with the image recording aspect of the system. It is noted here that the magnetic recording means for video signals may take, for an example, the form of a multi-channel head constructed by accumulating a great number of recording magnetic heads in a direction along the width of magnetic tape, that is, in a direction perpendicular to a direction in which said magnetic tape runs. In combination with the image recording system employing a multi-channel head of such construction, according to the present invention, there is proposed an image reproducing system with a reproducing multi-channel head of the same construction as that of the above-described recording multi-channel head. As the video signal is recorded in each of the odd-numbered and even-numbered fields alternately, when it is reproduced, it is required to pair up these field signals so that one frame of reproduced image can be obtained. For this purpose, use is made of a pair of odd-numbered and even-numbered field memory means, each of which can function as a one-field memory to individually memorize the video signals of all the lines in each field. During the time when the video signals from the reproducing multi-channel head are written in one of the memory means, the field signals, that is, the line video signals stored on the other memory means are read out in time sequence. Such procedures alternately repeat themselves to produce a corresponding number of one-frame video signals on pairing up the output video signals.

The image recording system of the present invention may otherwise employ as the above-mentioned recording means, for example, a rotary disc having arranged on the circumference thereof a great number of recording magnetic heads in equally spaced relation to each other, whereby the video signals can be recorded in each field on an area of a magnetic tape by the above-identified recording multi-head, as the magnetic tape is trained around the circumference of said rotary disc so as to make a predetermined angle of inclination with respect to said circumference, and while the tape being held in this state, the disc is rotated. The thus-recorded magnetic tape can apply to a presently common 2 field-1 frame type reproducing system.

These and other objects and features of the present invention will become apparent from the following detailed description of preferred embodiments thereof taken in conjunction with the accompanying drawings.

BRIEF DESCRIPTION OF THE DRAWINGS

FIG. 8 is a block diagram showing a practical example of the image recording system of FIG. 7.

FIGS. 9A to 9C are views showing the construction of a magnetic recording means suited for use in the image recording system of FIG. 8, with FIG. 9A showing a rotary head, FIG. 9B showing a stationary disc, and FIG. 9C showing an outline of the entire volume of said recording means and an arrangement relation between said recording means and a magnetic recording medium.

FIG. 16 is a block diagram showing the details of the control circuit in the circuitry shown in FIG. 14.

FIG. 17, including a–o, is a pulse timing chart of the output signals from the various portions of the control circuit shown in FIG. 16.

DETAILED DESCRIPTION OF THE PREFERRED EMBODIMENTS

By reference to FIG. 1, the essential components of one embodiment of a high speed image recording system according to the present invention will be explained first.

Figure 1:
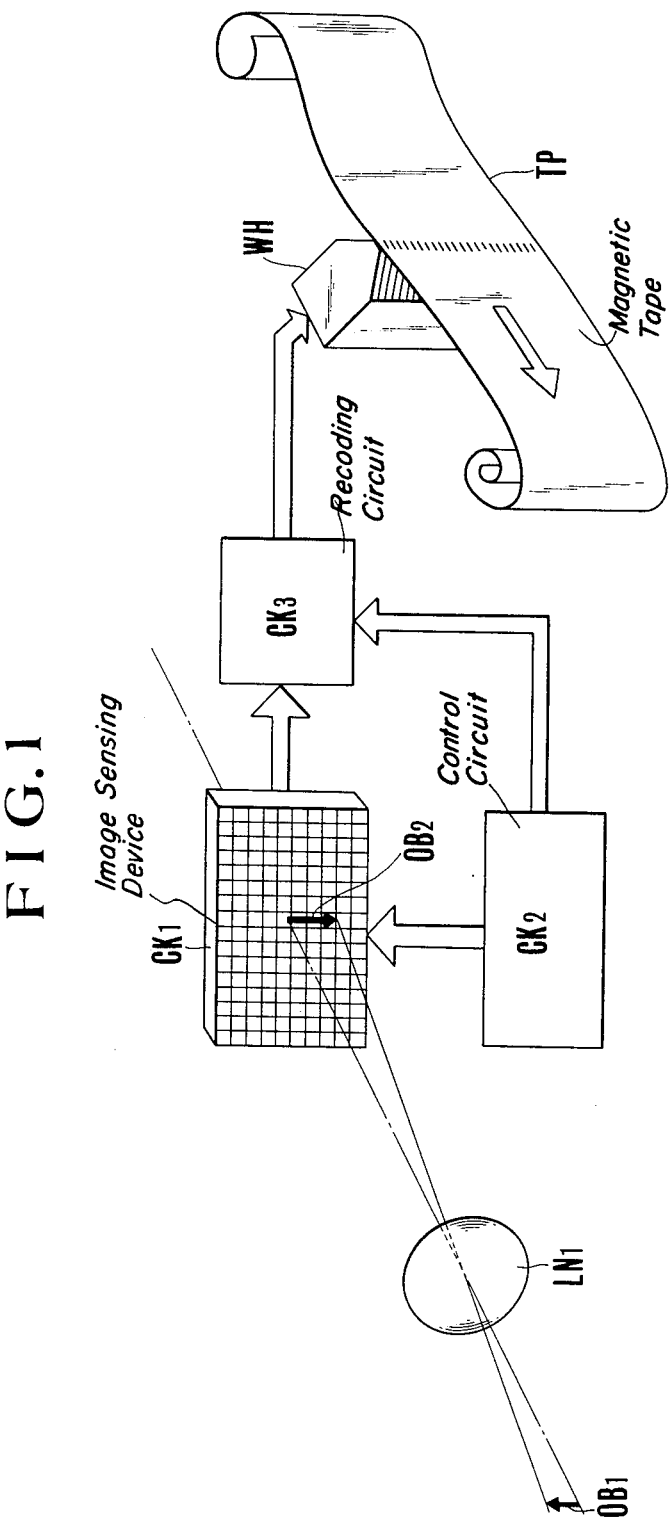
FIG. 1 is a schematic view showing the principles of one embodiment of a high speed image recording system according to the present invention.

In FIG. 1, OB1 is an object being photographed; and LN1 is a photo-taking lens, said photo-taking lens LN1 forming an image OB2 of the object OB1 on an image-receiving surface of an image sensing drive CK1. Said image sensing device CK1 is a self-scanning type solid-state image sensing device in the form of a two-dimensional image sensor having a two-dimensional arrangement of a great number of photo-sensitive elements provided with both of a photo-electric transducing function as in a CCD (Charge Coupled Device), BBD (Bucket Brigade Device), or photodiode array and a self-scanning function. It is noted that the details of construction of this solid-state image sensing device CK1 will be described in connection with FIG. 2. CK2 is a control circuit provides an output signal that controls the image-scanning operation of the solid-state image sensing device CK1, and also produces a control signal for a recording circuit CK3. Said recording circuit CK3 processes image-scanning signals from the solid-state image sensing device CK1 to produce video signals which are fed to recording means WH. These video signals are comprised of, for example, odd-numbered and even-numbered fields alternatively supplied to said recording means WH, so that multi-channel magnetic recording is performed. Said recording means WH is a multi-channel recording magnetic recording means constructed by arranging a plurality of magnetic heads in a row. In order to perform multi-channel magnetic recording in the direction of the width of a magnetic tape TP, the means WH is constructed in such a manner that a great number of magnetic heads are accumulated in a direction perpendicular to a direction in which said magnetic tape runs.

Next by reference FIG. 2, the details of the above-described image recording system will be explained.

Figure 2:
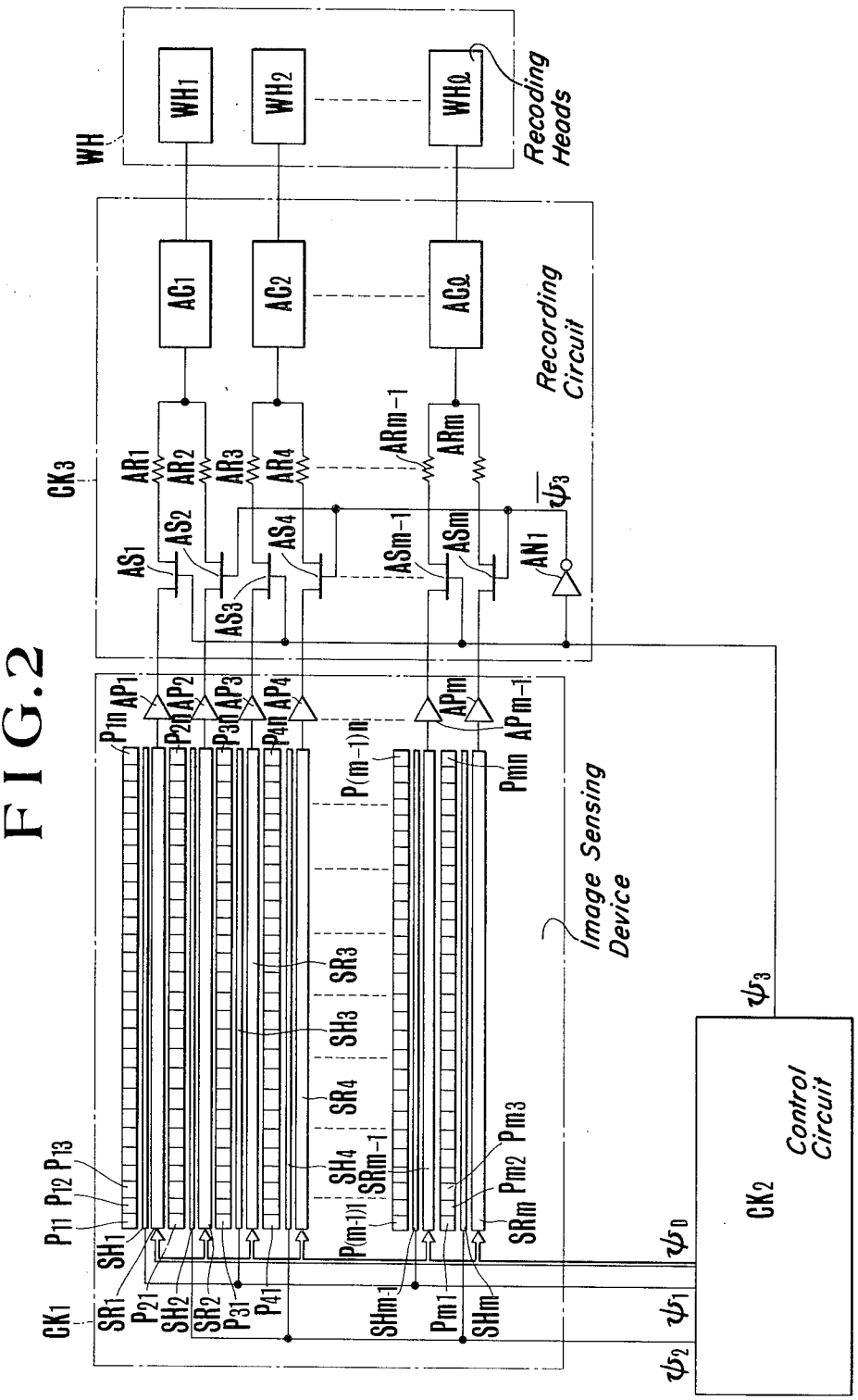
FIG. 2 is an electrical circuit diagram showing a practical example of the image recording system of FIG. 1.

In the FIG. 2, the above-described self-scanning solid-state image sensing device CK1 includes a group of $(m \times n)$ photo-sensitive elements P11-P1n, P21-P2n, ..., Pm1-Pmn, (where m is here an even integer), a group of charge transfer gates SH1 to SHm, and a group of charge transfer shift registers SR1-SRm, these group components being alternately arranged. And, the outputs of the shift registers SR1-SRm are taken out through respective buffer amplifiers AP1-APm. The photo-sensitive elements P11-Pmn are required upon individual receipt of the portions of the object image OB2 focused thereon to produce an electric charge pattern corresponding to a brightness distribution and are, therefore, two-dimensionally arranged as shown in the figure. In the latter connection, it should be further explained that, since the solid-state image sensing device CK1 of such construction may be considered in terms of a combination of one line arrays of photo-sensitive elements with one shift gate and one shift register, this combination constitutes a commonly known line type CCD or BBD image sensor. In conception, therefore, the above-identified solid-state image sensing device can be derived by arranging a plurality of these line type CCD or BBD image sensors to constitute a two-dimensional image sensor. In practice, therefore, it is easy to manufacture such solid-state image sensing device by the well-known techniques, for example, used for making the area type CCD or BBD image sensor of the frame transfer or the interline transfer type with the removal of its horizontal transfer shift register.

In the solid-state image sensing device CK1 of such construction, the above-described charge transfer gates SH1-SHm are divided into two groups of odd-numbered and even-numbered lines receptive of respective gate control pulses, $\psi 1$ and $\psi 2$, from the recording control circuit CK2. Also fed to the transfer registers SR1-SRm is a drive signal, $\psi D$, from the control circuit CK2. In addition to the control signals, $\psi 1$, $\psi 2$, and $\psi D$ for the solid-state image sensing device CK1, the control circuit CK2 produces a control signal, $\psi 3$, for the recording circuit CK3. The recording circuit CK3 comprises analog gates AS1-ASm, resistors AR1-ARm and processing circuits AC1-AC$_l$ for converting input signals to video signals to be recorded. The analog gates AS1-ASm are divided into two groups for the odd-numbered and even-numbered lines. Gating of the odd and even numbered lines controlled by the signal $\psi 3$ from the control circuit CK2 and an inverted signal $\overline{\psi 3}$ thereof passing through an inverter AN1 respectively. And, the individual line-scanning signals taken out through these analog gates AS1-ASm are applied through the respective resistors AR1-ARm to the processing circuits AC1-AC$_l$ where they are converted to video signals which are produced from said recording circuit CK3. The video signals are applied to respective multi-channel magnetic heads WH1-WH$_l$ in the recording means and therefrom recorded on a magnetic tape TP. Thus, the number, $l$, of multi-channel heads in the system of FIG. 2 can be reduced to $\frac{1}{2}$ times that, m, of image sensing element lines.

The operation of the image recording system of the above construction will be explained with reference to FIG. 3. Now assuming that, with the image OB2 of the object OB1 formed on the image-receiving surface of the solid-state image sensing device CK1, the control pulse $\psi 1$ from the control circuit CK2 is applied at a time, t1, to the charge transfer gates SH1, SH3, ..., SHm-1 contiguous to the odd-numbered lines of photo-sensitive element arrays P11-P1n, P31-P3n, ..., P(m-1)1-P(m-1)n in the solid-state image sensing device CK1. Then the charges corresponding to the object brightness distribution stored on the aforesaid odd-numbered lines of photo-sensitive element arrays at their individual photo-sensitive elements are simultaneously transferred through the respective charge transfer gates SH1, SH3, . . . , SHm-1 to the shift registers SR1, SR3, . . . , SRm-1, and therefrom further transferred in a manner known in the art by the drive pulse $\psi D$ from the control circuit CK2 through the buffer amplifiers AP1, AP3, . . . , APm-1 to simultaneously produce respective line-scanning signals in time sequence.

Figure 3:
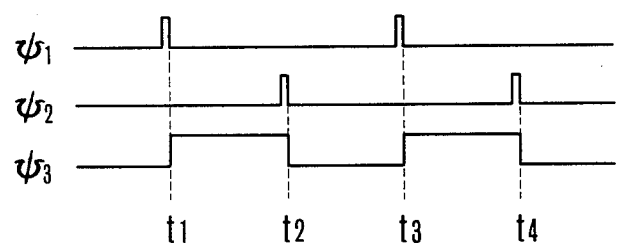
FIG. 3 is a pulse timing chart of the output signals from the control circuit of FIG. 2.

In a time interval from t1 to t2, as shown in FIG. 3, the control signal $\psi 3$ applied from the control circuit CK2 to the recording circuit CK3 is maintained at a high level at which the analog gates AS1, AS3, . . . , ASm-1 are gated on. Therefore, the individual odd-numbered line scanning signals are permitted to proceed through the respective resistors AR1, AR3, . . . , ARm-1 to the processing circuits AC1-AC$_l$, where they are converted into video signals which are to be recorded by the respective heads WH1-WH$_l$ in the recording means WH. Thus, during the time interval from time t1 to the time t2, the multi-channel magnetic recording means WH records the odd-numbered field video signal on the wide magnetic tape TP in sequence as the tape TP runs. It is noted here that while the analog gates AS1, AS3, . . . , ASm-1 are ON, the analog gates AS2, AS4, . . . , ASm are caused to be OFF by the concurrently inverted signal $\overline{\psi 3}$ from the inverter AN1.

When the time t2 is reached, the control pulse $\psi 2$ from the control circuit CK2 is fed to the charge transfer gates SH2, SH4, . . . , SHm contiguous to the even-numbered lines of photosensitive element arrays P21-P2n, P41-P4n, . . . , Pm1-PMn, thereby turning on these gates SH2, SH4, . . . , SHm to permit the charges stored on the individual photo-sensitive elements in the arrays of the even-numbered lines to be transferred to the respective registers SR2, SR4, . . . , SRm. In a manner similar to the above, they are produced as the even-numbered line-scanning signals in time sequence from the buffer amplifiers AP2, AP4, . . . , APm. On one hand, in a time interval between the time t2 and a time t3, the control signal $\psi 3$ from the control circuit CK2 remains at a low level. The recording circuit CK3 therefore operates in such a manner that while the analog gates AS1, AS3, . . . , ASm-1 are OFF, the concurrently inverted signal $\overline{\psi 3}$ from the inverter AN1 turns on the analog gates AS2, AS4, . . . , ASm. Therefore, the above-identified even-numbered line-scanning signals are fed through the resistors AR2, AR4, . . . , ARm to the respective processing circuits AC1-AC$_l$ where they are converted to video signals which are to be recorded. After that, the even-numbered field video signals are recorded on the magnetic tape TP by the recording means during the time from the time t2 to the time t3 in a manner similar to the above.

In one embodiment of the image recording system according to the present invention, since such procedure repeats itself in a period corresponding to the line scanning period of the solid-state image sensing device CK1, the time necessary to record one field is clearly proven to be equal to that of one line scanning period of the solid-state image sensing device CK1. Thus, it is made possible to achieve a far higher speed image recording than the conventional image recording system of the interlaced scanning type.

Figure 4:
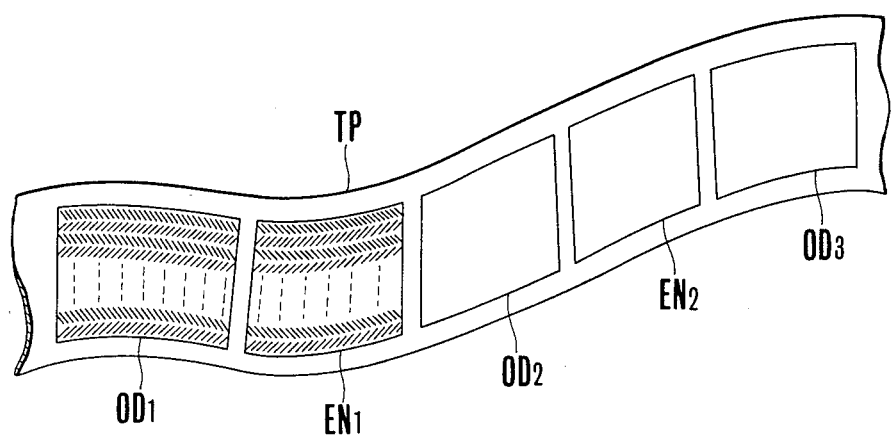
FIG. 4 is a perspective view showing recorded patterns on a magnetic recording medium processed by the system of FIGS. 1 and 2.

An example of image pattern recorded on the above-described magnetic tape TP in the manner described above is shown in FIG. 4, where OD1, OD2, . . . , are patterns of the odd-numbered fields, and EN1, EN2, . . . are patterns of the even-numbered fields. In order to minimize cross-talk between the adjacent channels, it is preferred to create a suitable angle between the successive adjacent heads in the recording means WH.

Next, one embodiment of a reproducing system according to the present invention suitable for reproducing the recorded image of the magnetic recording medium obtained from the above-described image recording system will be explained.

Figure 5:
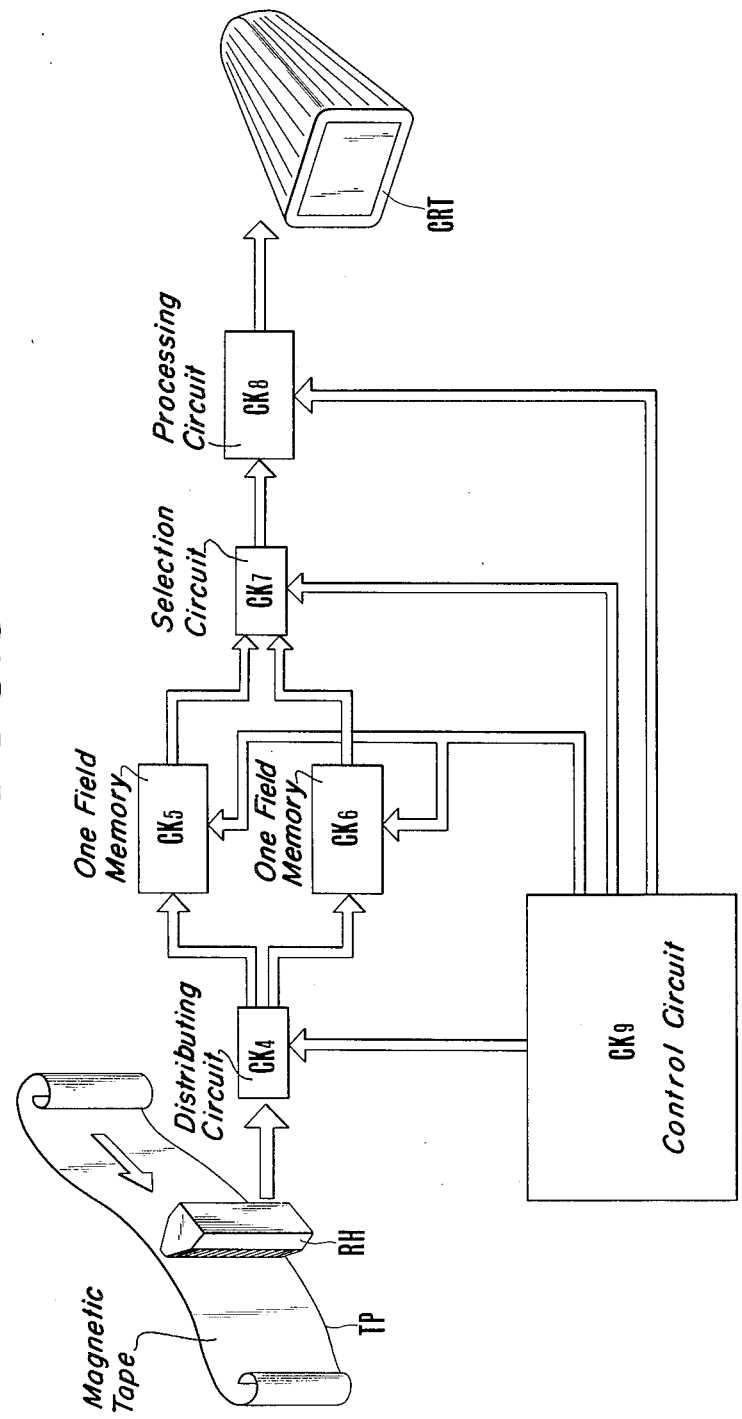
FIG. 5 is a schematic view showing the essential components of one embodiment of a reproducing system according to the present invention adapted for use in particular with the image recording system of FIG. 1.

FIG. 5 shows the basic components of this embodiment of the reproducing system. In FIG. 5, RH is magnetic reproducing means having a multi-channel head of similar construction to the recording means WH as will be described later. CK4 is a video distributing circuit receptive of signals from the reproducing means RH and responsive to a control signal from a reproduction control circuit CK9 for separately producing video signals of odd-numbered and even-numbered fields. CK5 and CK6 are individual memory means each of which functions as a one-field memory, memory CK5 storing the video signal of the odd-numbered field, and memory CK6 storing the video signal of the even-numbered field. These memory means CK5 and CK6 respond to control signals from the control circuit CK9 to alternately write-in and read-out the video signals. It is noted that as will be described later these memory means CK5 and CK6 individually produce time sequential video signals indicating the order of the individual lines which are alternately fed to a selection circuit CK7. CK8 is a video processing circuit for a display device CRT, for example, of the standard horizontal-vertical deflection type. As indicated above, display device CRT can be a conventional TV display having a two-field per frame interlaced scan, the frame rate being, e.g., 30 frames per second. This processing circuit CK8 is known in the art and is controlled by the control signal from the control circuit CK9 to produce composite video signals.

Figure 6:
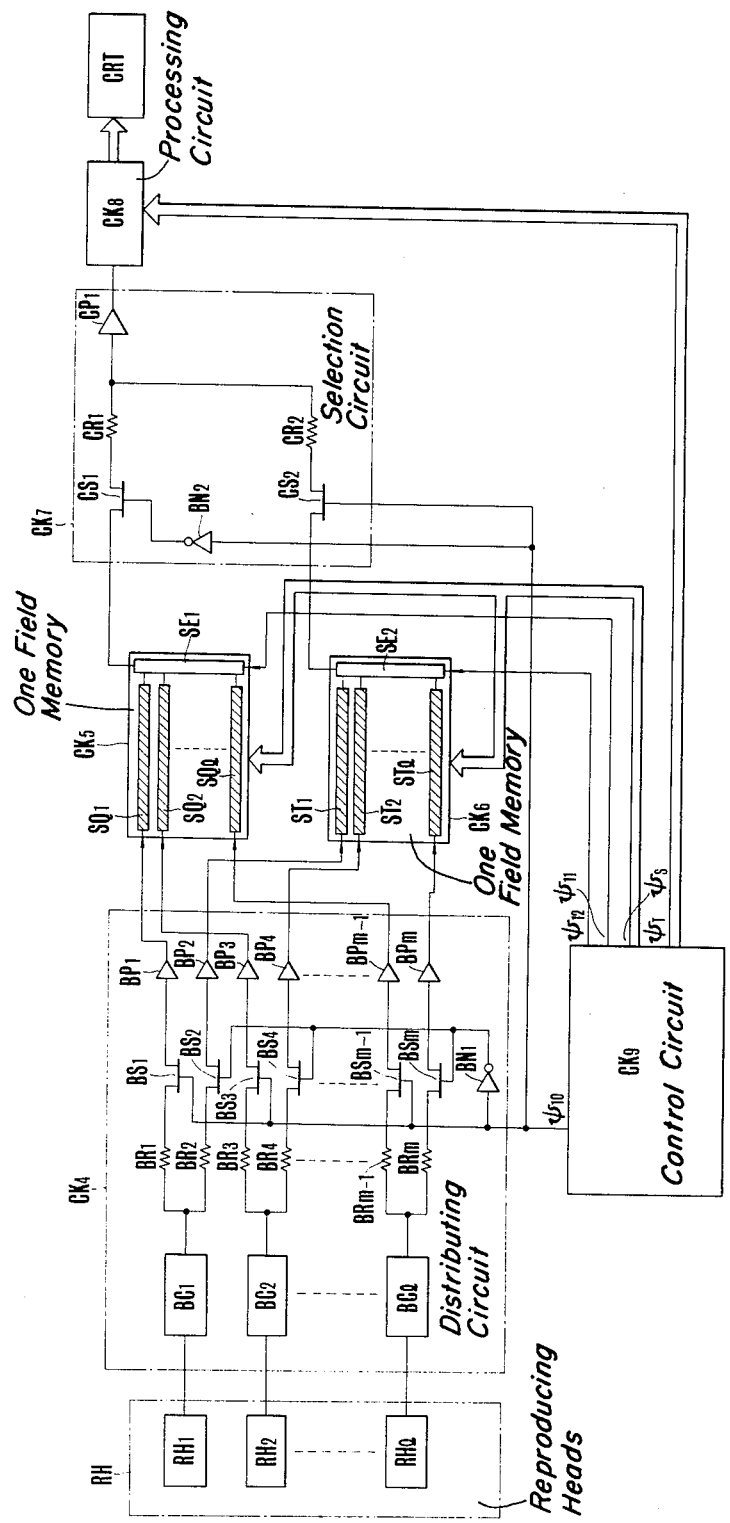
FIG. 6 is an electrical circuit diagram showing a practical example of the reproducing system of FIG. 5.

The details of the above-described reproducing system will be explained with reference to FIG. 6. In FIG. 6, the above-described reproducing means RH is constructed in a similar manner to that of the image recording means WH in the above-described image recording system as an accumulation of multi-channel reproducing heads RH1-RH$_l$ in a direction along the width of the magnetic tape TP. Upon reproduction, these multi-channel reproducing heads RH1-RH$_l$ pick up signals to produce outputs which are then applied to the video distributing circuit CK4. Said distributing circuit CK4 comprises known amplifying and waveform shaping circuits BC1-BC$_l$, resistors BR1-BRm, analog gates BS1-BSm, buffer amplifiers BP1-BPm and an inverter BN1. Upon response to a gating control signal $\psi 10$ from the control circuit CK9 the input video signal is divided into video signals of the odd-numbered and even-numbered fields which are separately produced therefrom. In other words, when the reproducing head RH1-RH$_l$ scans each of the odd-numbered field line video patterns on the magnetic tape TP, the analog gates BS1, BS3, . . . , BSm-1 are turned on. Conversely when it scans each of the even-numbered field line video patterns, the analog gates BS2, BS4, . . . , BSm are turned on. Therefore, the odd-numbered line video signals are supplied through the buffer amplifiers BP1, BP3, . . . , BPm-1 to be written in the first memory means CK5 for one field memory, and the even-numbered line video signals also are supplied through the buffer amplifiers BP2, BP4, ..., BPm to be written in the second memory means CK6 for one field memory. During the time when the odd-numbered field video signals are reproduced and written in the memory means CK5, the even-numbered field video signals which were already stored on the memory means CK6 are read out in time sequential manner, while during the time when the even-numbered field video signals are written in said memory means CK6, the odd-numbered field video signals are read out likewise from the memory means CK5. These operations are controlled by control signals $\psi S$, $\psi 11$ and $\psi 12$ from the control circuit CK9. Each of the one-field memory means CK5 and CK6 comprises analog shift registers $SQ1-SQ_l$, or $ST1-ST_l$, and a selection gate SE1 or SE2 for successively selecting these registers $SQ1-SQ_l$, $ST1-ST_l$. The above-described registers $SQ1-SQ_l$ and $ST1-ST_l$ are always driven by the drive clock $\psi S$ from the control circuit CK9. The selecting operation of the selection gates SE1 and SE2 are controlled by the gating control signals $\psi 11$ and $\psi 12$ from the control circuit CK9 respectively, whereby the selection gate SE1 is caused to successively select the line video outputs of the line registers $SQ1-SQ_l$ and the selection gate SE2 is caused to successively select the line video outputs of the line registers $ST1-ST_l$. Thus, produced from the selection gate SE1 are the odd-numbered field video signals in the order of the line numbers, and also from the selection gate SE2 are the even-numbered field video signals in the order of the line numbers, these outputs being fed to the next stage or the selection circuit CK7. Said selection circuit CK7 comprises analog gates CS1 and CS2, resistors CR1 and CR2, a buffer amplifier CP1, and an inverter BN2, and is controlled in a manner similar to that of the above-described distributing circuit CK4 by the control signal $\psi 10$ from the control circuit CK9. Therefore, when reading the odd-numbered field video signals from the tape TP, the memory means CK6 is read out for reproducing the even-numbered field video signals which are produced by turning on the gate CS2. Conversely when in reading the even-numbered video signals from the tape TP, the memory means CK5 is read out for reproducing the odd-numbered field video signal which are produced by turning on the gate CS1. As a result, said selection circuit CK7 alternately produces both of the odd-numbered and even-numbered field video signals. This output, after having been superimposed by the horizontal-vertical drive pulses in the video processing circuit CK8 because of its using the adaptation of the interlaced scanning to the display, is fed as the standard video signal to the display device CRT. This video processing circuit CK8 is controlled by the control signal $\psi T$ from the control circuit CK9. If it is at an ordinary speed that the horizontal-vertical scanning is performed to obtain a reproduced image on the fluorescent surface of the display device CRT, as the image was recorded at a high speed on the above-described tape TP, therefore, an extremely slow motion effect will be resulted.

Another embodiment of the high speed image recording system according to the present invention will be described below.

Figure 7:
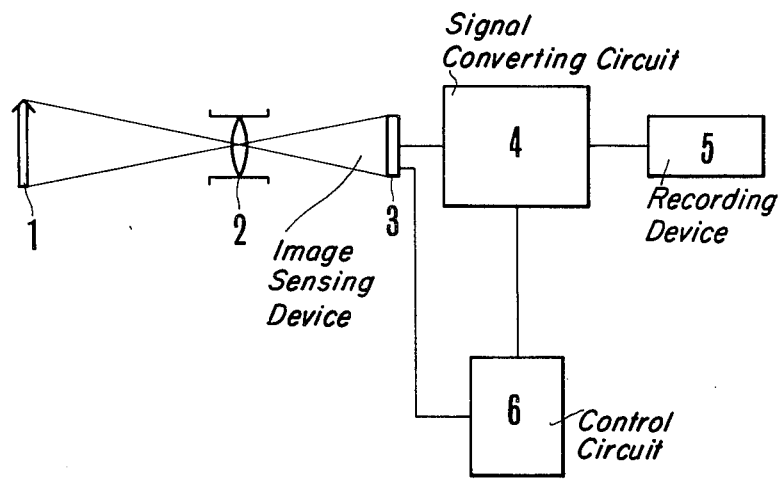
FIG. 7 is a schematic view showing the essential components of another embodiment of a high speed image recording system according to the present invention.

At first referring to FIG. 7, there is shown the basic construction of this embodiment. In FIG. 7, 1 is an object being photographed; 2 is a photo-taking lens; 3 is a self-scanning type solid-state image sensing device having an image receiving surface on which an image of the object 1 is formed by the lens 2. Said image sensing device 3 is constructed by arranging (m×n) photo-sensitive elements in a two dimensional matrix form so that video signals corresponding to the brightnesses of the image portions related to the individual photo-sensitive elements can be read out in the form of sequential voltages. It is noted that said image sensing device 3 has an additional feature similar to that of the first embodiment described above in that the time sequential line scanning signals from the individual line arrays of photo-sensitive elements can be obtained simultaneously. 4 is a signal converting circuit for receiving the individual line scanning brightness signals from the image sensing device 3 for producing signals of corresponding frequencies. 5 is a magnetic recording device for recording video signals on a magnetic tape by use of a multi-channel magnetic head. 6 is a control circuit for producing a drive clock for the image sensing device 3 and horizontal synchronizing and vertical synchronizing signals as television signals, these signals controlling the operation of the image sensing device 3 and the signal converting circuit.

A practical example of the above-described image recording system will next be described below with reference to FIGS. 8 to 12.

At first referring to FIG. 8, there is shown a practical example of the above-described signal converting circuit 4. In FIG. 8, the image sensing device 3 is assumed to comprise 486×392 photo-sensitive elements arranged in the form of a matrix, on the two-dimensional surface of which an object image is formed. B1–B243 are signal converting circuits of the same construction shown in B1 each receptive of an odd-numbered line scanning signal and a separate even-numbered line scanning signal from the above-described image sensing device 3. A1–A20 are synchronizing signal converting circuits of the same construction shown at A1 receptive of the vertical synchronizing signals from the control circuit 6 for producing recording signals. The control circuit 6 is shown in greater details in FIG. 11, and its various control outputs are fed to the above-described image sensing device 3 and the signal converting circuits B1–B243 and A1–A20 whose outputs are fed to the above-described recording device 5.

Figure 12:
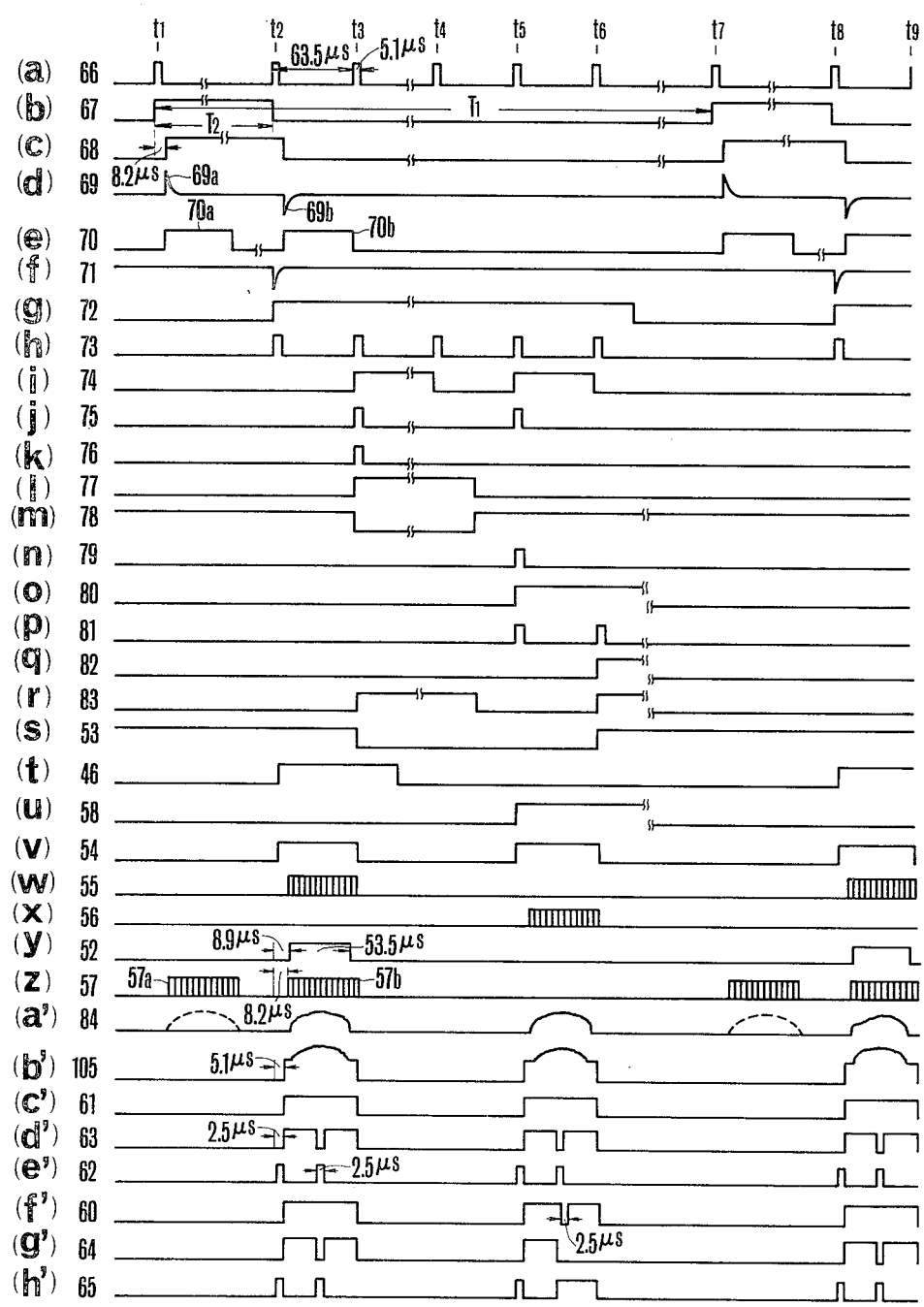
FIG. 12, including a–z and a'–h', is a pulse timing chart of the output signals from the various portions of the control circuit shown in FIG. 11.

In such arrangement, in response to a reading-out signal 57 (z in FIG. 12) from the control circuit 6, the above-described image sensing device 3 produces outputs at its individual linear arrays $i_1-i_{486}$ simultaneously which are read out from the first photo-sensitive element $l_1$ to the last one $l_{392}$ at a frequency of 7.159 MHz. As the odd-numbered and even-numbered lines are paired up successively, these pairs of outputs total 243 at a time and are applied each as scanning output 84 (a' in FIG. 12) to the respective signal converting circuits B1, B, ..., B243, where each pair of inputs are amplified by respective amplifiers 7 and 8. The amplified inputs are sampled and held by analog switches SW3 and SW4 and condensers C1 and C2 in response to a control signal 59 from the control circuit 6, and then amplified again by video amplifiers 9 and 10 respectively. Of the thus processed pairs of signals, each of the even-numbered line signals is applied to and stored on an analog shift register 11. The outputs of the amplifier 9 and analog shift register 11 are selected by an analog selection switch SW7. Responsive to a switching control signal 53 (s in FIG. 12) from the control circuit 6, a movable pole X1 is connected to a fixed contact Z1 so that the output of the amplifier 9 is applied to an amplifier 12. Thus, the odd-numbered lines are written in. In the case of the even-numbered lines to be written in, in response to a shift register reading-out signal 56 (x in FIG. 12) from the control circuit 6, the shift register 11 produces an output which is applied to the amplifier 12 through the analog switch SW7. The output of the amplifier 12 after having the high frequency component removed by a low pass filter circuit 13 is subjected to selective amplification by a pre-emphasis circuit 14 so that attenuation which is produced in magnetic recording is previously compensated for. A portion of the ouput of the pre-emphasis circuit 14 is smoothed by a detecting circuit 15. By the magnitude of output of the detecting circuit 15, the gain of the amplifier 12 is varied to buffer a rapid variation of the signal. The output of said pre-emphasis circuit 14 is applied to a superimposing circuit 16 where it is subjected to superimposition with a horizontal synchronizing signal 61 (c' in FIG. 12) from the control circuit 6, and then converted to a signal of a frequency ranging from 3.1 MHz to 4.5 MHz by a voltage-frequency converting circuit 17. Said converted frequency signal after amplification by a recording amplifier circuit 18 is fed to a recording device. The input of the recording amplifier circuit 18 is connected through an analog switch SW9 to a circuit ground, so that as shown in FIG. 12, it is grounded according to a control signal 54 (v in FIG. 12) from the control circuit 6 between time intervals for recording t2-t3, t5-t6, t8-t9, and so on.

The image scanning signals from the individual lines $i_1$-$i_{484}$ in the image sensing device 3 are processed in each pair of odd-numbered and even-numbered lines by the respective circuits B1-B243 of the same construction and fed to the recording device 5. It is noted that in this case the lines $i_{485}$ and $i_{486}$ are connected to the signal converting circuit B243 so that their outputs are processed in a similar manner to the above. In order to enter a vertical synchronizing signal in the even-numbered scanning 0.5 H faster, a signal 60 (f' in FIG. 12) is provided as the superimposing signal from the control circuit 6, and analog switches SW1 and SW5 and analog switches SW2 and SW3 are controlled by a signal 52 (y in FIG. 12) from the control circuit 6 and a signal 109 from a pulse generating circuit 108 which will be described later in the control circuit 6 respectively. As has been mentioned above, A1-A20 are circuits for converting vertical synchronizing signal formed by the control circuit 6 into recording signals, and the vertical synchronizing signals to be recorded are converted into corresponding frequency signals by the voltage-frequency converting circuit 19, and after having been amplified by the recording amplifier circuit 20 are fed to the recording device. The input of the amplifier 20 is connected through an analog switch SW8 to the circuit ground, and this analog switch SW8 is controlled by a control signal 54 (v in FIG. 12) from the control circit 6 in a similar manner to that of the analog switch SW9. The converting circuits A1 to A20 though having the same construction are separated into a group of A1 to A5 and A15 to A20 that receives a signal 61 (c' in FIG. 12) as a vertical synchronizing signal, a group of A6, A7 and A12 to A14 that receives a signal 63 (d' in FIG. 12), A8 that receives a signal 64 (g' in FIG. 12), a group of A9 and A10 that receives a signal 62 (e' in FIG. 12), and A11 that receives a signal 65 (h' in FIG. 12).

The circuitry of such construction provides the above-described recording device 5 with the outputs of the above-described converting circuits A1-A20 and B1-B243, and outputs of said device 5 are recorded on a recording medium such as magnetic recording tape. A practical example of said recording device will next be explained with reference to FIGS. 9A to 9C.

Referring first to FIG. 9B, there is shown a fixed portion of the recording device 5. As shown in the figure, a fixed disc 91 has 263 recording head electrodes H1-H263 positioned thereon along a curve 92 in equally spaced relation so as to make angles of 40' with each other in their radius vectors. The electrodes each have a miniature ball such as shown at 95 as a contactor, and said ball 95 resides in a recessed lead electrode 94 to become an electrode having a resilient property. Further, said ball 95 is connected to the respective electrode H1-H263 by way of leads 97 that extend along a curve to a symmetrically opposite position on a curve 96 center-symmetric to the curve 92. The individual electrodes H1-H263 are connected through holes 99 to an electrode on the backside of a substrate 100, and said backside electrode is connected by way of a lead 101 to the signal converting circuit 4. Here, 93 is an ground electrode. It is noted that in this case, of the above-described 263 head electrodes H1-H263, the head electrodes H1-H5 are connected to the respective outputs of the converting circuits A1-A5 shown in FIG. 8, the head electrodes H6-H248 to the respective outputs of the signal converting circuits B1-B243, and the head electrodes H249-H263 to the respective outputs of the converting circuits A6-A20.

Figure 9C:
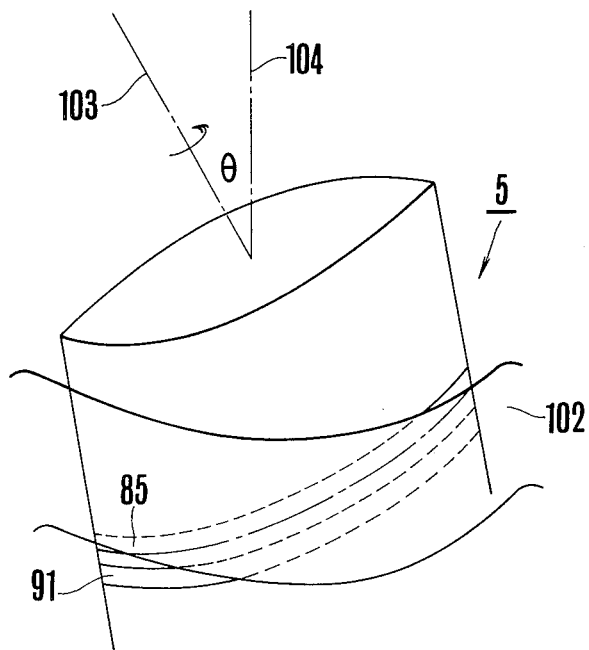
Figure 9A:
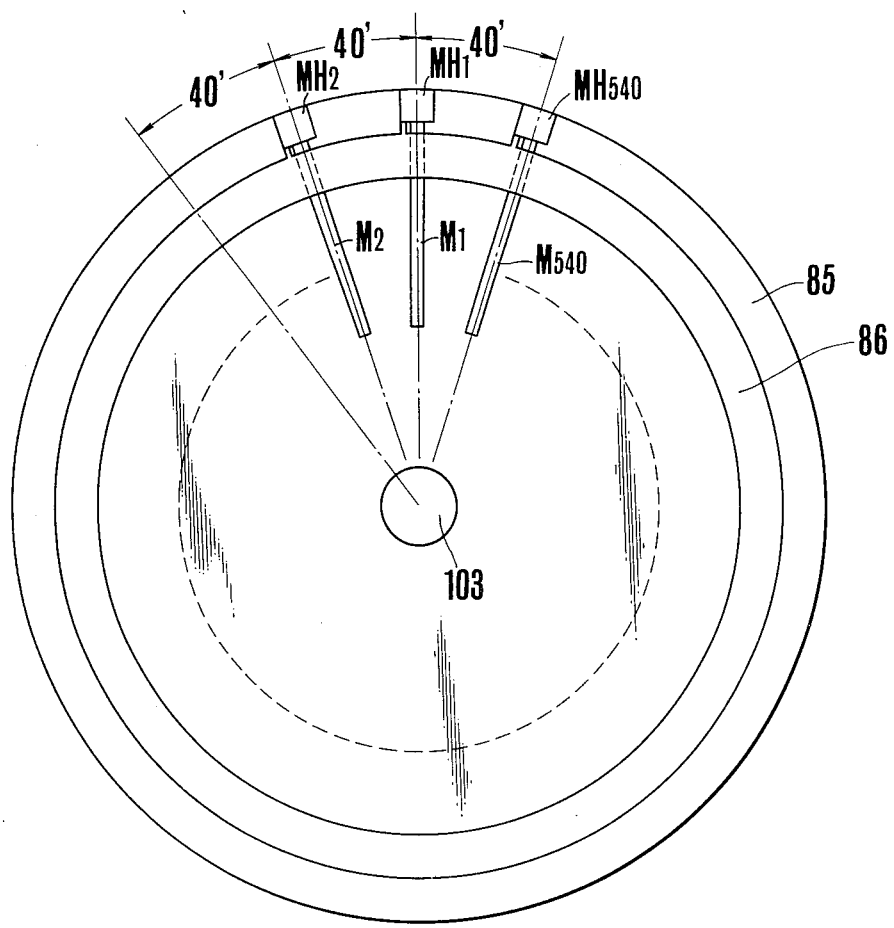
Figure 10:
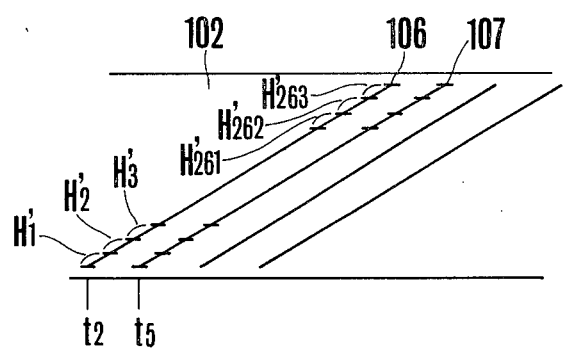
FIG. 10 is a schematic view showing recorded patterns on the magnetic recording medium on which the images are recorded by the recording means of FIGS. 9A to 9C.

Turning to FIG. 9A, the construction of a movable part relative to the above-described stationary part is shown. As shown in the figure, on the circumference of a disc 85 rotatable with reference to the above-described stationary disc 91, there are arranged 540 magnetic recording heads MH1-MH540 in equally spaced relation so as to make angles of 40' with each other. And, these heads MH1-MH540 have a common electrode 86 and individual electrodes M1-M540 arranged upon sliding movement over the balls in the above-described stationary disc 91 to select 263 magnetic heads from the 540 heads MH1-MH540.

As shown in FIG. 9C, the axis 103 of the rotary disc 85 makes an angle $\theta$ with the normal 104 of a plane in which a magnetic tape 102 is moved, and said disc 85 always rotates at a constant speed. On the other hand, the stationary disc 91 having the electrodes H1-H263 is positioned so that the signals fed to these electrodes H1-H263 are recorded at respective specific positions H'1-H'263 along a line 106 or 107 (FIG. 10) on the tape 102. Therefore, the correspondence of the individual magnetic heads MH1-MH540 with the individual lead electrodes 94 is assumed not to be fixed but to be variable with arbitrarily variable recording time. For example, the magnetic head which corresponds with 94' will be perhaps MH2 at one time, and MH540 at another. The tape 102 remains stationary during the recording. In a time interval of 63.5 $\mu$s, one field is recorded. For example, after the odd-numbered field signals have been recorded in the line 106 on the tape 102, the tape 102 is driven by a tape driving device (not shown) to move through a predetermined length. Then the even-numbered line signals are read out from the above-described analog shift registers 11. Then a signal conversion similar to the above is performed to record even-numbered field signals in the line 107 of the tape 102. After the completion of said recording, the tape 102 is moved again. Such procedure completes recording of one image frame, and makes the system ready for next frame photography. Since one frame is recorded so as to correspond to one frame of television picture, its recording speed corresponds to the line reading speed of the image sensing device 3, and therefore a high speed recording is possible.

Figure 11:
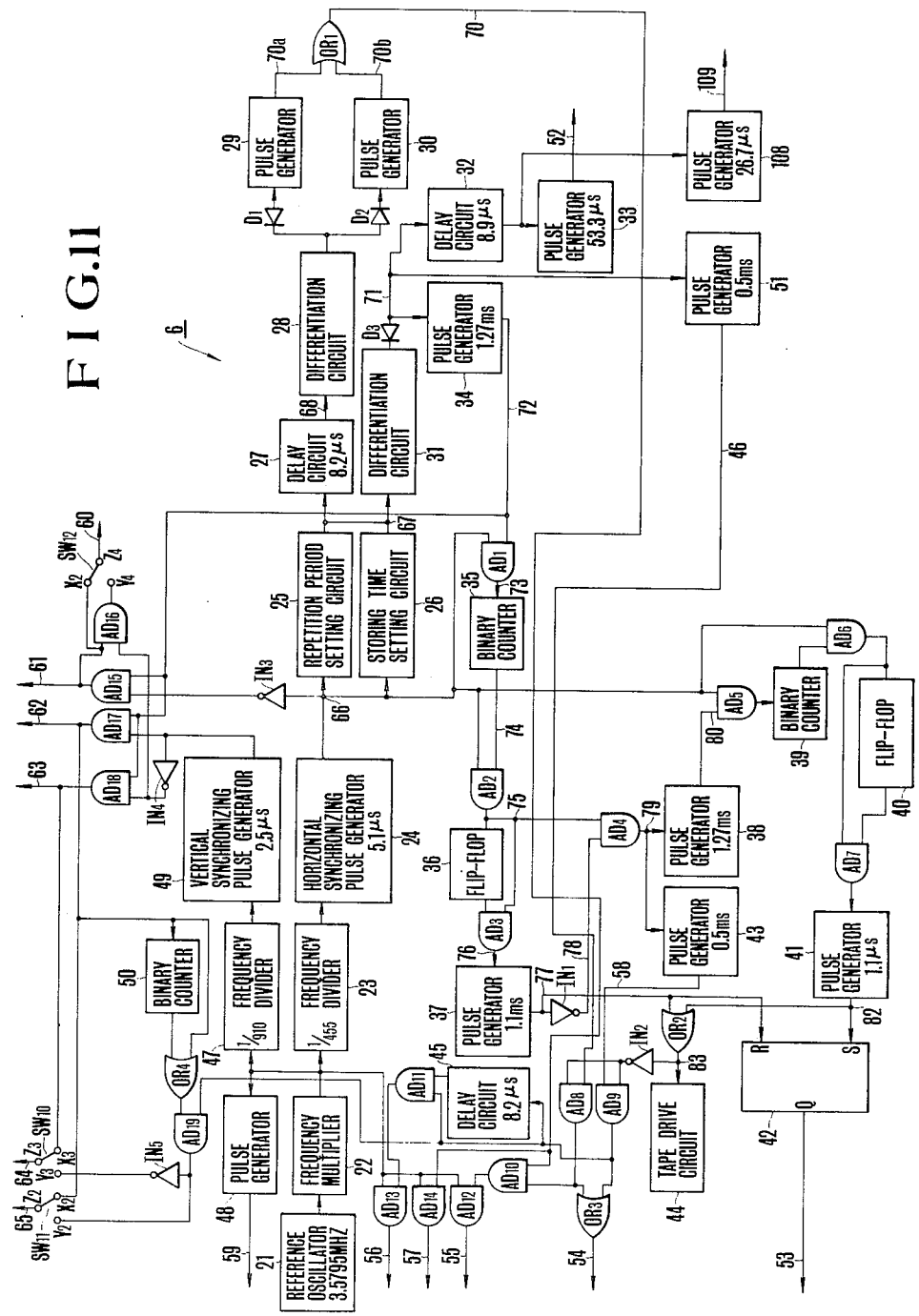
FIG. 11 is a block diagram showing the details of the control circuit in the circuitry shown in FIG. 8.

By reference to FIGS. 11 and 12, the details of the above-described control circuit 6 will next be explained. In FIG. 11, 21 is an oscillator for producing reference clock pulses at a frequency of 3.5795 MHz which is doubled by a frequency multiplier 22 with production of clock pulses at a frequency of 7.159 MHz. The output pulses of the frequency multiplier 22 after having been divided by 455 by a 1/455 frequency divider 23 is fed to a horizontal synchronizing pulse generating circuit 24 which produce a train of horizontal synchronizing pulses (a in FIG. 12) of a pulse width 5.1 μs and a repetition period of 63.5 μs. Again the output pulses of said frequency multiplier 22 after having been divided by 910/4 in a 4/910 frequency divider 47 is fed to a vertical synchronizing pulse generating circuit 49 which produces a train of vertical synchronizing pulses of a width of 2.5 μs and a repetition period of 31.75 μs. The horizontal synchronizing pulse train 66 from the above-described horizontal synchronizing pulse generating circuit 24 is fed to a repetition period setting circuit 25 and a storing time setting circuit 26. As shown on a line (b) in FIG. 12, the repetition period T1 (T1=t7−t1) synchronized with the horizontal synchronizing signal, and the storing time T2 (T2=t2−T1) of the image sensing device 3 are thereby selected. The repetition period T1 and time T2 are adjusted to desired values provided that they are an integral multiple of the horizontal synchronizing signal repetition period and satisfy T1≧T2+63.5 μs, and the set value of storing time T2 depends upon the brightness. An output of said setting circuit 25, 26 is applied to a delay circuit 27 which produces an output (c in FIG. 12) in a delay time of 82 μs, and this output is then fed to a differentiation circuit 28 which produces control signals 69 (d in FIG. 12) representative of the start and termination of the storing time for the image sensing device 3. The start signal 69a and the termination signal 69b are applied through respective diodes D1 and D2 to respective pulse generating circuits 29 and 30 where they are respectively converted into drive timing and drive time setting signals 70a and 70b and are connected through an OR gate OR1 to be superimposed with the output pulses of the above-mentioned multiplier circuit 22 by an AND gate AD14, with the resultant outputs becoming drive signals 57a and 57b (z in FIG. 12) for the image sensing device 3. The video signal read out in response to the drive signal 57a formed from the storing start signal 69a are removed by grounding the analog switches SW1, SW2, SW5 and SW6 in the signal converting circuits B1-B243 shown in FIG. 8. The output signal 67 from the setting circuit 25, 26 is passed through a differentiation circuit 31 and a diode D3 to become a signal 71 (f in FIG. 12) which is applied to pulse generating circuits 34 and 51 which produce pulses 72 (g in FIG. 12) and 46 (t in FIG. 12) of widths of 1.27 ms and 0.5 ms in synchronization with the horizontal synchronizing signals. The signal 72 along with the horizontal synchronizing signals is applied through an AND gate AD1, binary counter 35, AND gate AD2, flip-flop 36, and AND gate AD3 to a pulse generating circuit 37 which produces pulses of a width of 1.1 ms serving as a tape driving signal 77 (1 in FIG. 12) after the recording of the odd-numbered field signals. This tape driving signal 77 is, on the other hand, inverted by an inverter IN1, and this inverted signal 78 (m in FIG. 12) is combined with an output signal 75 (j in FIG. 12) from AND gate AD2 by an AND gate AD4 to produce a trigger signal 79 (n in FIG. 12) for the even-numbered field recording. Thus, the even-numbered field signal recording operation starts at time (t5) of a first horizontal synchronizing signal after the odd-numbered field signal recording operation terminates at time (t4) and the tape 102 is stopped. Said trigger signal 79 is applied to pulse generating circuits 38 and 43 which produce a pulse signal of a width of 1.27 ms (o in FIG. 12) and a pulse signal 58 (u in FIG. 12) of a width of 0.5 ms. The output signal from the pulse generating circuit 39 along with the horizontal synchronizing pulses is applied through an AND gate AD5, a binary counter 39, an AND gate AD6, a flip-flop 40 and an AND gate AD7 to a pulse generating circuit 41 which produces a tape drive signal 82 of a width of 1.1 ms (q in FIG. 12) after the completion of the even-numbered field signals. Said tape drive signal 82 along with the output signal 77 of the pulse generating circuit 37 is applied to an OR gate OR2 which produces a signal 83 (r in FIG. 12) which is fed to a tape driving circuit 44. On the other hand, the output signal 77 of the pulse generating circuit 37 is applied to a "reset" input terminal of a flip-flop 42, and the tape drive signal 82 is applied to a "set" input terminal of the flip-flop 42, thus serving as a control signal 53 (s in FIG. 12) for the analog switch SW7 in the signal covering circuits B1-B243 shown in FIG. 8 and for the switches SW10, SW11 and SW12 shown in FIG. 11. The analog switch SW7 connects across X-Z when the signal 53 is at a high level, and across Y-Z when at a low level, whereby the odd-numbered and even-numbered lines are selected. On the other hand, the tape drive signal 82 from the OR gate OR2 is inverted by an inverter IN2 and then is logically multiplied by a pulse signal 46 of a width of 0.5 ms from the pulse generating circuit 51 by an AND gate AD8, and by a signal 58 from the circuit 43 by an AND gate AD9. The outputs of these AND gates AD8 and AD9 are logically added by an OR gate OR3 to produce an output 54 (v in FIG. 12) serving as a control signal for the grounding analog switches SW9 and SW8 connected in each of the input stages of the recording amplifier circuit 18 in the signal converting circuits B1-B243 of FIG. 8 and the recording amplifier circuit 20 in the converting circuits A1-A20. Said analog switches SW9 and SW8 are ON when said control signal 54 is at a low level, and OFF when at a high level. By such switching operation, error recording is prevented from occurring when the recording is not performed. The output of the AND gate AD8 is logically multiplied by the output signal 70 of the OR gate OR1 by an AND gate AD10, and the output of said AND gate AD10 logically multiplied by the output pulse of the multiplier circuit 22 by an AND gate AD12. Thus, a writing-in signal (w in FIG. 12) for the analog shift register 11 in the signal converting circuits B1-B243 of FIG. 8 is formed. On the other hand, the output of the AND gate AD9 is subjected to a time delay of 8.2 μs by a delay circuit 45, and said delayed signal is logically multiplied by the delay-independent output signal from said AND gate AD9 by an AND gate AD11, and then logically multiplied by the output pulse of the multiplier circuit 22 by an AND gate AD13. Thus, a reading-out signal 56 (x in FIG. 12) for the above-described analog shift register 11 is formed. On the other hand, the output 71 (f in FIG. 12) from the differentiation circuit 31 through the diode D3 is converted to a pulse signal 52 (y in FIG. 12) of a width of 53.3 μs delayed 8.9 μs from the horizontal synchronizing signal by a delay circuit 32 and pulse generating circuit 33, which signal 52 serves as a control signal for the analog switches SW1, SW2, SW5 and SW6 in the signal converting circuits B1–B243 of FIG. 8. Said switches SW1, SW2, SW5 and SW6 are ON when the control signal 52 is at a low level, and OFF when at a high level. By such switching operation, the brightness signal in the horizontal blanking period is made zero. On the other hand, said brightness signal is superimposed by a superimposing circuit 16 with horizontal synchronizing superimposed signals 61 (c' in FIG. 12) and 60 (f' in FIG. 12) formed by an inverter IN3, and AND gates AD15 and AD16. The vertical synchronizing pulse from the vertical synchronizing pulse generating circuit 49 is logically multiplied by a gate pulse 72 (g in FIG. 12) from the pulse generating circuit 34 by an AND gate AD17, serving as a vertical synchronizing signal 62 (e' in FIG. 12) which is applied to the voltage-frequency converting circuit 19 in the converting circuits A9 and A10 of FIG. 8. Again the vertical synchronizing pulse from the vertical synchronizing pulse generating circuit 49 after having been inverted by an inverter IN4 is logically multiplied by a gate pulse 72 from a pulse generating circuit 34 by an AND gate AD18, serving as an equalized pulse 63 (d' in FIG. 12) which is applied to the voltage-frequency converting circuits 19 in the converting circuits A6, A7, A12–A14 of FIG. 8. Again, the vertical synchronizing signal 62 is applied, on one hand, through a binary counter 50 and, on the other hand, directly to an OR gate OR4 to take logic sum thereof. The output of the OR gate OR4 is logically multiplied with an output of an AND gate AD9 by an AND gate AD19 having an output which serves on one hand as a synchronizing signal 65 (g' in FIG. 12) for the even-numbered lines, and on the other hand, after being inverted by an inverter IN5, as a synchronizing signal (g' in FIG. 12), these signals 65 and 64 being applied to the respective voltage-frequency converting circuits 19 in the converting circuits A11 and A8 of FIG. 8. It is noted here that the signals 60, 64 and 65 for effecting the change-over between the odd-numbered and even-numbered lines through the analog switches SW12, SW10 and SW11 are made to correspond to the interlace TV scanning.

When a storing start command is given at time t1 in FIG. 12, the drive signal 57a (z in FIG. 12) for the image sensing device 3 is formed to read out the information which has so far been stored on the image sensing device 3. But this information is removed as the analog switches SW1, SW2, SW5 and SW6 are turned on. At a time (t2) of termination of the storing time, the stored information of the image sensing device 3 is again read out in response to the image sensing device drive signal 57b (z in FIG. 12). At this time, the odd-numbered line signals along with the horizontal synchronizing signals are recorded on the tape 102 until the time t3. On the other hand, at this time, the even-numbered line signals are stored in the analog shift register 11 in response to the signal 55 (w in FIG. 12) from the output of an AND gate AD12. After this operation has been completed at time t3, in response to the drive signal 83 (r in FIG. 12) from the OR gate OR2 the tape driving device (not shown) moves the tape 102 through the predetermined length until time t4. After this feeding of the tape has been completed, in synchronism with a first horizontal synchronizing pulse (t5), the even-numbered line information is read out of analog shift register 11 is read and then said information is written in. After this operation has been completed at time t6, the tape 102 is again driven to move through the predetermined length, and a next storing command (t7) is readied. In a series of operations in the time interval t1–t7, one-frame of an image is recorded. In other words, the image averaged within the storing time from t1 to t2 is recorded in one frame.

It is noted that the above-described embodiment of the system has a horizontal resolving power dependent upon the number of image compartments in each horizontal line, (or an array of photo-sensitive elements $l_1$ to $l_{392}$). Since the number of elements is limited by the reading speed of the image sensing device 3, the horizontal resolving power cannot be increased to as large a value as desired. It is, however, possible to increase the resolving power to some extent by modifying the arrangement of the matrix pattern of the photo-sensitive elements 3 in such a manner that those of the photo-sensitive elements which are located in the odd-numbered lines i1, i3, . . . , i485 are displaced by half the distance between the successive two photo-sensitive elements in each line, while the remaining photo-sensitive elements in the even-numbered lines remain unchanged in position, as shown at 3' in FIG. 8, where the blank regions, taking for an example, 112 between the successive two photo-sensitive elements 110 and 111 in each individual odd-numbered line are vertically aligned with one of the photo-sensitive elements, say, 113 or 114 in each individual even-numbered line. Thus, the resolving power in the horizontal direction can be increased without the necessity of increasing the number of the image sensing elements.

Figure 13:
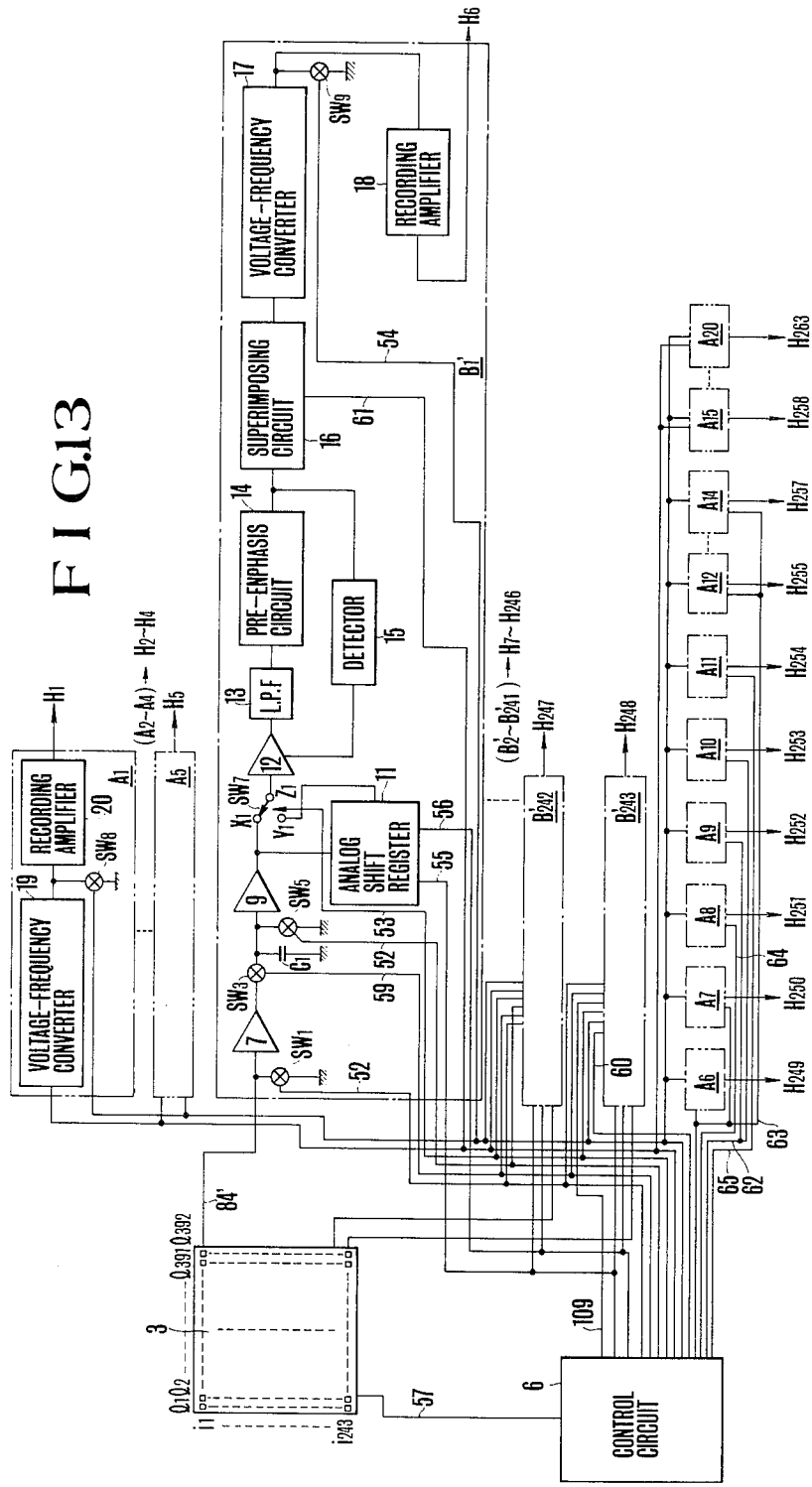
FIG. 13 is a block diagram showing another practical example of the image recording system of FIG. 7.

FIG. 13 shows an example of modification of the embodiment explained in connection with FIGS. 8 to 12. This modified embodiment employs an image sensing device having a number of photo-sensitive element arrays decreased by ½ times that of the embodiment of FIG. 8, that is, i1–i243 (in other words, ½ the number of effective horizontal scanning lines in a television picture). Therefore, in scanning an image, the odd-numbered lines and even-numbered lines provide the same information for one-frame. Though the vertical resolving power is sacrificed to some extent, the number of photo-sensitive element arrays is decreased advantageously. With this system, the individual line signals 84' read out from the image sensing device 3 are applied to the signal converting circuits B'1–B'243 where they are amplified, then sampled, and then the stored level of the sample is amplified again. The amplified sample is conducted through the analog switch SW7 to the amplifier 12, and to the analog shift register 11. Therefore, it is, at first, the odd-numbered field lines that are conducted through an X1–Z1 connection of the analog switch SW7 to be recorded, while simultaneously permitting the even-numbered lines to be stored in the analog shift register 11. The analog switch SW7 is then changed to establish a connection Y1–Z1 through which the stored even-numbered lines are read out to be recorded. The remaining operation of the system of this embodiment that follows the above proceeds in a similar manner to that described in the above-described embodiment of FIG. 8, and therefore there is here omitted further detailed explanation thereof.

Referring to FIGS. 14 to 17, there is shown a further embodiment of an image recording system according to the present invention as another practical example of the system of FIG. 7. In this embodiment, the image sensing device is provided with a plurality of memory means each of which stores scanning signal from a predetermined number of lines as one group. When the image sensing device operates to scan an individual image, each line scanning signal is stored in the respective memory means, and then the plurality of line scanning signals stored in each memory means are successively read out. Scanning each signals stored in each memory means are read out one at a time successively to be recorded. It is thereby made possible to achieve reduction of the number of the above-described signal converting circuits.

Figure 14:
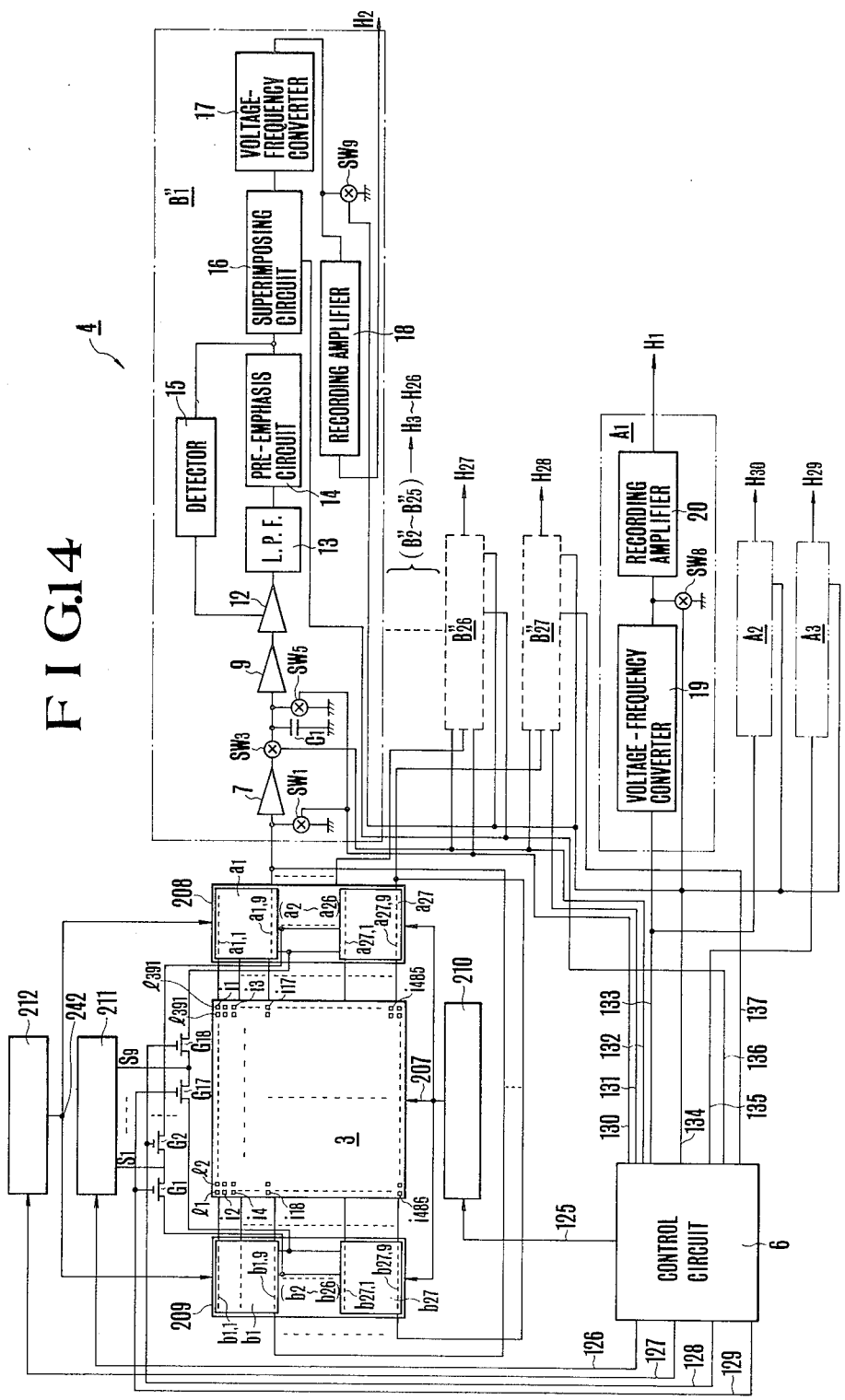
FIG. 14 is a block diagram showing still another practical example of the image recording system of FIG. 7.

In FIG. 14, the details of a signal converting circuit 4 (shown in FIG. 7) adapted for use in this embodiment are shown. In FIG. 7, 3 is an image sensing device having the same two-dimensional arrangement of 486×329 photo-sensitive elements in the matrix form as that in the embodiments of FIGS. 8 and 13. 208 is an odd-numbered line analog memory device fo storing the odd-numbered lines being connected in every nine lines as one group to memory blocks a1-a27 constituting said analog memory device 208 so that after the scanning signals from the odd-numbered lines are simultaneously stored in the memory blocks a1-a27, they are read out from the top memory line in each of memory blocks a1-a27 successively. 209 is likewise an even-numbered line analog memory device for storing the even-numbered line scanning signals of the image sensing device 3, having memory blocks b1-b27 each of which stores every nine even-numbered line signals as one group. The scanning signals from the even-numbered lines are simultaneously stored in the corresponding memory blocks b1-b27. When the memory is read, the memory blocks b1-b27 are read out each from the top line successively. 210 is a shift register for feeding the image sensing device 3 with a reading-out signal and for feeding the memory devices 208 and 209 with writing-in signals; 211 is a shift register for producing a line selection signal; 212 is a shift register for producing a memory signal reading-out signal; G1-G18 are line selection analog gates for selecting a memory line in each of individual memory blocks a1-a27, b1-b27, these gates G1-G18 all being controlled by control signals from a control circuit 6 (of which the details are shown in FIG. 16) B"1-B"27 are signal converting circuits for converting the outputs of the memory blocks a1-a27, and b1-b27 to recording video signals, having the same construction (shown in B"1). This construction of each of said signal converting circuits B"1-B"27, as is understood from the figure, is slightly modified from that of the signal converting circuits B'1-B'243 (shown at B"1) by removing the analog shift register 11 and analog switch SW7. A1-A3 are synchronizing signal converting circuits having the same construction as that in the embodiments shown in FIGS, 8 and 13.

As is evident from the foregoing, since a total number of converting circuits B"1-B"27, A1-A3 is thirty, this embodiment employs a recording device 5 of such construction that thirty head electrodes H1-H30 are arranged in a distance of 4.5° from each other along a curve 92 on a stationary disc 91 as shown in FIG. 9B, and that, on the cicumference of a rotary disc 85 as shown in FIG. 9A, there are arranged eighty recording heads MH1-MH80 likewise at a distance of 4.5° from each other. During recording, thirty recording heads of said eighty recording heads MH1-MH80 are arbitrary selected for operation. Accordingly, an example of said recording device 5 applicable to this embodiment is different from that shown in FIGS. 9A-9C only in the number of electrodes and the number of heads, and the remaining parts are entirely similar in construction to those shown in FIGS. 9A-9C. For this reason there is no additional drawing therefor.

With such system, when the shift register 210 produces a reading-out signal 207, the individual image component signals from the image sensing device 3 are read out based on a reading-out control signal 125 from the control circuit 6 simultaneously for all the lines i1-i486 along each individual array $l_1$ to $l_{239}$ at a frequency of 7.15 MHz. At this time, those of the scanning signals from the lines i1-i486 which are produced from the odd-numbered lines are written in the memory device 208, and those from the even-numbered lines in the memory device 209 respectively by a writing-in signal 207. Said memory devices 208 and 209 each have the 27 memory blocks a1-a27 and b1-b27 with every 9 lines in one group. For example, the scanning signals from the odd-numbered lines i1, i3, . . . , i17 are stored in respective lines a1,1-a1,9 of the memory block a1 of the memory device 208. Likewise the scanning signal from the even-numbered lines i2, i4, ..., i18 are stored in respective lines b1,1-b1,9 of the memory block b1 of the memory device 209. The remaining scanning signals are likewise stored for the odd-numbered lines in the corresponding blocks in the device 208 and for the even-numbered lines in the corresponding blocks in the memory device 209. In other words, the odd-numbered field signals are stored in the memory device 208, and the even-numbered field signals are stored in the memory device 209. The outputs of each of the memory devices 208 and 209 at the corresponding memory blocks $a_n$ and $b_n$ are applied to a video amplifier 7 in a respective one of the signal converting circuits B"1-B"27, in this instance, B"n. Responsive to a line selection control signal 126 from the control circuit 6, the shift register 211 produces line selection signals S1-S9. The line selection signals are fed to the respective lines of each of the memory blocks a1-a27, b1-b27 in the memory devices 208 and 209 through the gates G1-G18 which are gated on by odd-numbered and even-numbered field selection signals 128 and 129 respectively. In other words, when the odd-numbered field selection signal 128 is at a high level, gates G2, G4, . . . , G18 are turned on, while at this time the even-numbered field selection signal 129 is at a low level, and therefore the gates G1, G3, . . . , G17 are OFF. The individual lines in each of the memory blocks a1-a27 of the memory device 208 are sucessively selected beginning with a first line $1_n,1$, and upon occurrence of a stored signal reading-out control signal 127 from the control circuit 6 which is followed by the production of a stored signal reading-out signal 242 from the shift register 212, are successively fed to the signal converting circuit $A_n$. Thus, the line signals in each individual memory block a1-a27 are successively read out from the line $a_n,1$, and all of the memory blocks a1-a27 are read out in parallel. At this time, the even-numbered field signals stored in the memory device 209 are protected from being read out because of the closure of the gates G1, G3 . . . , G17. Then, when the even-numbered field selection signal 129 changes to a high level, the gates G1, G3, . . . , G17 are turned on, while at this time the odd-numbered field selection signal 128 changes to a low level to turn off the gates G2, G4, . . . , G18. Therefore, the even-numbered field signals stored in the memory device 209 are read out in a similar manner to the above. The signals read from the individual memory blocks a1,-a27, b1-b27 are applied to the respective signal converting circuit B"1-B"27. Said signal is amplified by the amplifier 7, sampled and held by an analog switch SW3 and a condenser C1 in response to a control signal 132 from the control circuit 6, and then amplified again by a video amplifier 9. The thus-amplified signal after having been amplified by a video amplifier 12 is filtered to remove the high frequency component thereof by a low pass filter circuit 13, and then is subjected to selective amplification of the high frequency component by a pre-emphasis circuit 14 to preliminarily compensate for the high frequency attenuation which is to be effected during magnetic recording. The output of said pre-emphasis circuit 14 is applied to a superimposing circuit 16, wherein it is superimposed on a horizontal synchronizing signal 136 from the control circuit 6, converted to a frequency signal of from 3.1 MHz to 4.5 MHz by a voltage-frequency converting circuit 17, and then said converted signal after having been amplified by a recording amplifier circuit 18 is produced. The thus-obtained recording video signals from the individual signal converting circuit B"1-B"27 are fed to the recording head electrodes H2-H28 respectively.

On the other hand, the synchronizing signal converting circuits A1, A2 receive a vertical synchronizing signal 133 from the control circuit 6, while to the synchronizing signal converting circuit A3 receives a vertical synchronizing signal 135. These synchronizing signals 133 and 135 after having been converted to frequency signals by the respective voltage-frequency converting circuits 19 and then amplified by a recording amplifier circuit 20 are thereby produced. The thus-obtained output signals from the individual synchronizing signal converting circuits A1-A3 are applied to respective electrodes H1, H30 and H29 of the recording head.

It is noted that the inputs of the individual recording amplifier circuits 18; 20 in these signal converting circuits B"1-B"27 and A1-A3 are connected to the circuit ground through respective analog switches SW9; SW8 which are shunted by a control signal 134 from the control circuit 6 when not in recording. Further, the input of each of the amplifiers 7 and 9 in each of the signal converting circuits B"1-B"26 is connected to the circuit ground through a respective analog switch SW1, SW5 which are shunted by a control signal 130 from the control circuit 6 when in the horizontal blanking period. On the other hand, unlike this, as the signal converting circuit B"27 is adapted to produce a vertical synchronizing signal 0.5 H faster, a control signal 131 for the analog switches SW1 and SW5 therein and a superimposing signal 137 for a superimposing circuit 16 are made to differ from the control signal 130 for the above-described signal converting circuits B"1-B"26 and the super-imposing signal 136 by that time interval.

It is further noted that the above-described analog switches SW1, SW3, SW5 and SW9 are assumed here to be turned on when the control signal 130 from the control circuit 6 is high.

Figure 15:
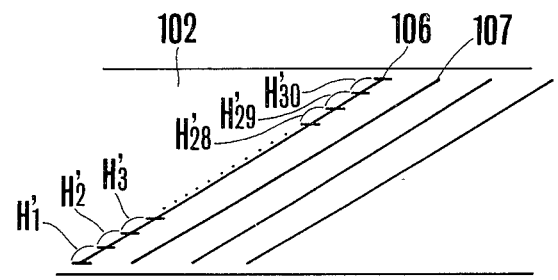
FIG. 15 is a schematic plane view showing recorded patterns on the processed magnetic recording medium.

It is now time to record images on a magnetic tape 102 through the recording device of such construction as described above. At this time, recorded patterns on the tape 102 may occur as shown in FIG. 15. That is, in the figure, a line 106 shows an odd-numbered field signal based on the signal read out from the memory device 208, while a line 107 shows an even-numbered field signal based on the signal read out from the memory device 209. And, positions H'1-H'30 on the line 106 show recorded positions of the individual recording signals passed through the above-described head electrodes H1-H30 respectively.

With reference to FIGS. 16 and 17, the control circuit 6 in this embodiment will next be explained in greater detail.

In FIG. 16, 138 is a reference oscillator for producing clock pulses at a frequency of 14.318 MHz which are divided by 2 in passing through a ½ frequency divider 139 to produce a train of clock pulses at a frequency of 7.159 MHz. Said clock pulses 178 are applied through a 1/455 frequency divider 243 to a horizontal synchronizing pulse generating circuit 140 which produces a train of horizontal synchronizing pulses of a width of 5.1 μs, and a repetition period of 63.5 μs (FIG. 17(a)). Said clock pulses 178 are, on the other hand, applied through a 4/910 frequency divider circuit 244 to an equalizing pulse generating circuit 141. The pulse generating circuit 141 is thereby caused to produce equalized pulses of a width of 2.5 μs, and a repetition period of 31.75 μs. The horizontal synchronizing pulse 167 is applied to a repetition period setting circuit 142 and a storing time setting circuit 143, whereby the repetition period T1 synchronous to the horizontal synchronizing pulse 167 and the storing time T2 for image information in the image sensing device 3 are respectively set (FIG. 17). The required values of repetition period T1 and storing time T2 are an integral number of times as large as the repetition period of the horizontal synchronizing pulse 167, and the storing time T2 depends upon the level of brightness. Said setting circuits 142 and 143 produce an output 168 (FIG. 17(b)) which is fed to a differential circuit 144, whereby a signal 169 (FIG. 17(c)) representative of the start or the termination of a storing operation is formed. Of these, the storing start signal 169a is fed through a diode D'1 to a pulse generating circuit 145, and the storing termination signal 169b is fed through a diode D'2 to a pulse generating circuit 146, thus serving as a drive timing and drive time setting signals for the image sensing device 3. And, the outputs of these pulse gnerating circuits 145 and 146 are fed through an OR gate OR'1 to an AND gate AD'3 for logically multiplying these with the clock pulse 178 from the above-described ½ frequency divider 139, serving as a drive signal 125 for the image sensing device 3. On the other hand, the image scanning signal read out from the image sensing device 3 in response to the storing start timing is applied to the memory device 208, 209. This concurrent input information is removed as a matter of course from the memory device 208, 209 by the image scanning signal read out in response to the following storing termination timing. Therefore, the image scanning signal read out from the image sensing device 3 in response to the storing termination timing is stored in the memory device 208, 209. An output 170 (FIG. 17(d)) of an OR gate OR'1 is inverted by an inverter IN'1 and then logically multiplied in an AND gate AD'1 with a pulse 181 of a width of 80 μs formed from the pulse generating circuit 147 at the storing termination timing and with a horizontal synchronizing pulse 167 from a horizontal synchronizing pulse generating circuit 140. The reading-out of the image sensing device 3 and a first synchronizing pulse 182 (FIG. 17(e)) after the memory completion of the concurrent scanning signal are thus selected. Said synchronizing pulse 182 is fed through an OR gate OR'2, and an AND gate AD'2 to a pulse generating circuit 149 which produces a pulse 172 (FIG. 17(f)) of a width of 650 μs. Said pulse 172 is applied to an AND gate AD'4, whereby said AND gate AD'4 selects eleven synchronizing signals 173 (FIG. 17(g)) from the above-described horizontal synchronizing pulses 167 for serving as the line selection signals when in reading out the stored signals from the memory device 208, 209. Said selected synchronizing signal 173, on one hand, serves as a control signal 126 for the shift register 211 of FIG. 14, and on the other hand after having been delayed 8.2 μs by a delay circuit 150 is fed to a pulse generating circuit 151. Then, said pulse generating circuit 151 produces a pulse 174 (FIG. 17(h)) of a width of 55.3 μs. This is logically multiplied in an AND gate Ad'5 with a clock pulse 178 from the ½ frequency divider circuit 139, serving as a stored signal reading-out control signal 127 for the shift register 212 of FIG. 14. Again, said signal 127 is fed to a pulse generating circuit 161, whereby said pulse generating circuit 161 is caused to produce a sample-holding control signal 132 for the analog switch SW3 in the signal converting circuits B"1-B"27 of FIG. 14. On the other hand, the output pulse 173 from the AND gate AD'4 is fed to a decade ring counter 152, and the concurrent output 186 of said counter 152 is fed through a differential circuit 153 and a diode D'3 to a pulse generating circuit 154, whereby said pulse generating circuit 154 is caused to produce a pulse 175 (FIG. 17(i)) of a width of 1.1ms in synchronization with an 11th pulse of the above-described selected synchronizing signal 173. This is supplied as a tape drive signal to a tape driving circuit 155.

Again, the output pulse 175 from said pulse generating circuit 154 is logically added and invertd in a NOR gate NOR1 with an output 186 of the decade ring counter 152, and the concurrent output 187 of the NOR gate NOR1 is logically multiplied in an AND gate AD'6 with an output pulse 172 from a pulse generating circuit 149 to produce a recording time control signal 134 (FIG. 17(j)) for the analog switches SW9, SW8 in the converting circuit B"1–B"27 and A1–A3. Again, the above-described pulse 175 is, on the other hand, fed through a differential circuit 156 and a diode D'4 to a pulse generating circuit 157 whereby said pulse generating circuit 157 is caused to produce a pulse 188 of a width of 80 μs, that is fed to an AND gate AD'7 and logically multiplied by a horizontal synchronizing pulse 167, whereby a first horizontal synchronizing pulse 189 (FIG. 17(e)) after the completion of tape movement is selected. Said pulse 189 is fed to an OR gate OR2, whereby, in a similar manner to that of the synchronizing pulse 182 from the above-mentioned AND gate AD'1, a reading-out signal 127, sample-holding control signal 132, line selection control signal 126 and recording time control signal are formed.

It is noted that since the above-described pulse 189 is logically multiplied by the AND gate AD'2 with the pulse of 2.2 ms formed by the pulse generating circuit 148 with the storing termination signal 169b from the above-described differential circuit 144, and AND gate AD'2 produces no record timing signal 171 (FIG. 17(e)) after the completion of recording of one frame.

On the other hand, the pulse 181 from the above-described pulse generating circuit 147 and the pulse 189 from the AND gate AD'7 are fed to "reset" and "set" terminals R and S of a flip-flop 158 respectively, whereby the output Q of the flip-flop 158 is made high during a time from the writing-in of the even-numbered field to the writing-in of the following odd-numbered field. Therefore, the Q output of the said flip-flop 158 is utilized as an even-numbered field selecting signal 129 and after having been inverted by an inverter IN'3, as an odd-numbered field signal 128, these signals 129 and 128 being applied to gates G1, G3, . . . , G17, and G2, G4, . . . , G18 respectively (FIG. 14).

On the other hand, the output pulse 173 from the above-described AND gate AD'4 after having been delayed 8.9 μs by a delay circuit 163 is fed to a pulse generating circuit 164, whereby said pulse generating circuit 164 is caused to produce a pulse of a width of 53.5 μs, this serving as a horizontal blanking period control signal 130 for controlling the analog switches SW1, SW5 in the signal converting circuit B"1–B"26 of FIG. 14. On the other hand, since a control signal 131 for the analog switches SW1 and SW5 in the signal converting circuit B"27 must be made different from the above-described control signal 130 to shorten the last raster in the even-numbered field by 0.5 H, this signal 131 is formed in such a manner as follows: It occurs at first that in the odd-numbered field, the gate G'11 opens and the above-described signal 130 is obtained as the signal 131. Next, in the even-numbered field, the first 8H are identical to those of the odd-numbered field, so that the above-described signal 130 is logically multiplied by the AND gate AD'14 with a signal 210 obtained through an AND gate AD'12, a 9-scale ring counter 165 and an inverter IN'5 to produce an output signal 213. Next, when in 9H, an output 207 of the 9-scale ring counter 165 and an equalizing pulse 179 from an equalizing pulse generating circuit 141 are logically multiplied by an AND gate AD'13, and the concurrent output 208 of said AND gate AD'13 triggers a flip-flop 166 which then produces an output Q serving as a high signal 209 for the first half 0.5 H of the 9 H. And, said signal 209 and the above-described signal 130 are logically multiplied by an AND gate AD'16 to obtain the 9H signal 214. Said 9H signal 214 and the 8H signal 113 from the above-described AND gate AD'14 are logically added by an OR gate OR'5 to produce an output which after having passed through a gate G'12 serves as a control signal 215 (FIG. 17(n)). Thus, said signal 215 and the above-described control signal 130 are combined with each other to obtain the above-described control signal 131 (FIG. 17(n)).

Discussion is next given to a superimposing signal 136, 137. At first, for the superimposing signal 136 to the signal converting circuits B"1–B"26, the synchronizing signal 173 from the AND gate AD'4 is inverted by an inverter IN'8 and said inverted signal serves as the superimposing signal 136. On the other hand, for the superimposing signal 137 for the signal converting circuit B"27, it is required to make the 9H of the even-numbered field equalizing pulses. This is accomplished as follows: It is at first that in the odd-numbered field, the gate G'13 produces the above-described superimposing signal 136 which serves as the signal 137 without any further procedure. On the other hand, in the even-numbered field, the above-described flip-flop 166 produces an output signal 209 which is inverted by an inverter IN'6, and this inverted signal 211 is logically multiplied by a signal 208 produced from the above-described AND gate AD'13 in NAND gate ND and inverted thereby. After that, the output 212 of said NAND gate ND1 and the above-described superimposing signal 136 are logically multiplied in an AND gate AD'19 to produce an output which after having passed through a gate G'14 serves as a superimposing signal 216 (FIG. 17(o)) in the even-numbered field. Thus, said signal 216 and the above-described signal 136 are combined with each other to obtain the above-described superimposing signal 137 (FIG. 17(o)).

Finally, discussion is given to the vertical synchronizing signal 133, 135 for the vertical synchronizing signal converting circuits A1-A3, At first, the vertical synchronizing signal 133 for the converting circuits A1 and A2 is identical to a horizontal synchronizing signal at portions hidden in the top and bottom of the television picture, and therefore can be obtained by phase-inverting the horizontal synchronizing pulse 167 from the above-described horizontal synchronizing pulse generating circuit 140 in an inverter IN'9. As the vertical synchronizing signal 133 is always produced by inverting the horizontal synchronizing pulse 167, the last 5H of the signals fed to the head electrode H1 and the first 6H of the signal fed to the head electrode H30 are recorded on the tape by controlling the position of the recording head and the tape and by operation of the analog switch SW8 in the converting circuit A1, A2.

On the other hand, as to the vertical synchronizing signal 135 for the converting circuit A3, it is required to insert a vertical synchronizing signal in the even-numbered field 0.5 H faster. This is achieved as follows: At first, in the odd-numbered field, the output pulses 173 from the above-described AND gate AD'4 are counted by a 7-scale ring counter 162 to produce a signal 191. Said signal 191 is inverted by an inverter IN'7 to produce a signal 192 which is logically multiplied in an AND gate AD'17 with a recording time control signal 134 from the above-described AND gate AD'6 to produce a signal 193 (FIG. 17(l)). Said signal 193 after passing through a gate G'7 serves as a control signal 177 (FIG. 17(l)) for a gate G'5. The equalizing pulse generating circuit 141 is thereby controlled to produce equalizing pulses 179 which after having been inverted by the inverter IN'4 to produce inverted pulses 204 serve as the vertical synchronizing signal 135. Thus said inverted equalizing pulses 204 (FIG. 17(m)) are produced for a predetermined time. Again the output signal 191 of the above-described counter 162 is, on the other hand, logically multiplied in an AND gate AD'18 with the recording time control signal 134 from the above-described AND gate AD'6 to produce a signal 194 (FIG. 17(k)) which after having passed through a gate G'10 serves as a control signal 176 (FIG. 17(k)) for a gate G'6. The equalizing pulses 179 (FIG. 17(m)) are thereby produced as the vertical synchronizing signal 135. As a result, in the odd-numbered field, the equalizing pulses 179 and their inverted pulses 204 are combined with each other to obtain the vertical synchronizing signal 135 (FIG. 17 (m)).

On the other hand, in the even-numbered field, as the control signal 176, 177 for the above-described gates G'5, G'6, use is made of the signal 202 (FIG. 17 (k)) and signal 203 (FIG. 17 (l)) obtained by elongating the vertical synchronizing signal by 0.5 H after having passed through gates G'8 and G'9 respectively. The equalizing pulses 179 and their inverted pulses 204 are thereby combined with each other to obtain a signal (FIG. 17 (m)) as the vertical synchronizing signal 135. It is to be noted that the above-described control signals 202 and 203 are formed based on the above-described signals 134, 129, 193, 194 and 179 by a circuit comprising an AND gate AD'8, a flip-flop 159, AND gates AD'9 and AD'10, a diode D'5, a 6-scale ring counter 160, an OR gate OR'4, an inverter IN'2 and an AND gate AD'11.

As has been described in detail, the video system of the present invention utilizes as the image sensing device one particularly capable of simultaneously reading out the individual line scanning signals. Image recording signals are thereby obtained from the individual line scanning signals obtained when images are scanned. According to this, as compared with the conventional interlaced scanning, the image recording speed can be remarkably increased, and therefore a far higher speed image recording than in the conventional high speed video system is made possible. Thus, upon reproduction at an ordinary speed, a slow motion at a rate that is a very small fraction of the normal reproduction rate can be obtained. Thus, as a high speed video system, it is very valuable.

What is claimed is:

1. An image recording and reproducing system comprising in combination:
    (a) image scanning means having an array of a plurality of linear scanning portions arranged for concurrently producing a plurality of sequences of line scanning video signals corresponding to line portions of a received image;
    (b) means for concurrently recording said plurality of sequences of line scanning video signals on and along corresponding ones of different line video signal recording channels of a recording medium, said recording means having a plurality of recording element each for recording one sequence of line scanning video signal on the corresponding line video signal recording channel as a substantially continuous line video signal;
    (c) means for concurrently reproducing the sequences of line video signals recorded on the recording medium; and
    (d) means for concurrently receiving the sequences of line video signals reproduced from the recording medium and for putting out each of the received sequences of line video signals in a time seriating manner in the order of line numbers so as to form a substantially continuous standard field or frame display signal.

2. An image recording system comprising:
    (a) an image scanning device having an array of a plurality of linear scanning means arranged for concurrently producing a plurality of sequences of linear scanning signals corresponding to a received image;
    (b) means for concurrently extracting at most all the sequences of linear scanning signals from said plurality of linear scanning means in said scanning device;
    (c) circuit means for concurrently receiving the extracted sequences of scanning signals and for concurrently producing a plurality of sequences of recording signals in response to said extracted sequences of scanning signals;
    said circuit means including:
        means for converting said extracted sequences of scanning signals into said plurality of sequences of recording signals;
        means for concurrently accepting said extracted sequences of scanning signals extracted by said extracting means from said plurality of linear scanning means in said scanning device;

means for concurrently storing said extracted sequences of scanning signals from said accepting means; and means for selecting either one of the scanning signals accepted through said accepting means and the scanning signals stored in said storing means for alternate application to said converting means; wherein said converting means produces first and second field recording signals in response to the signals accepted through said accepting means and the signals stored in said storing means, respectively; and (d) means for concurrently receiving said plurality of sequences of recording signals and for concurrently recording the sequences of recording signals on different corresponding portions of a recording medium; said recording means having at least the same number of recording members for concurrently recording the signals on a recording channel of the recording medium at different portions of the recording medium as the number of said linear scanning means in said scanning device; and said recording means including rotating means for concurrently rotating said recording members along corresponding ones of the recording channels of the recording medium.

3. The system according to claim 2, wherein said image scanning device has an array of a plurality of light-responsive elements, and wherein each of said plurality of linear scanning means includes a linear array of a plurality of said light-responsive elements.

4. An image recording system comprising:
(a) an image scanning device having an array of a plurality of linear scanning means arranged for concurrently producing a plurality of sequences of linear scanning signals corresponding to a received image; said plurality of linear scanning means in said scanning device being arranged in odd-numbered and even-numbered groups; said scanning device having an even number of said linear scanning means;
(b) means for concurrently extracting at most all the sequences of linear scanning signals from said plurality of linear scanning means in said scanning device;
(c) circuit means for concurrently receiving the extracted sequences of scanning signals and for concurrently producing a plurality of sequences of recording signals in response to said extracted sequences of scanning signals;
said circuit means including:
means for converting said extracted sequences of scanning signals into said plurality of sequences of recording signals;
means for concurrently accepting those of said extracted sequences of scanning signals extracted by said extracting means which originate from one of the odd-numbered and even-numbered groups of said plurality of scanning means in said scanning device as first field scanning signals;
means for concurrently storing those of said extracted sequences of signals extracted by said extracting means which originate from the other group of the odd-numbered and even-numbered groups of said plurality of scanning means in said scanning device as second field scanning signals; and means for selecting either one of said first field scanning signals accepted through said accepting means and said second field scanning signals stored in said storing means for application to said converting means; wherein said converting means comprises means for producing first and second field recording signals in response to said first and second field scanning signals, respectively; and (d) means for concurrently receiving said plurality of sequences of recording signals and for concurrently recording the sequences of recording signals on different corresponding portions of a recording medium; said recording means having recording members for concurrently recording the signals on a recording channel of the recording medium at different portions of the recording medium equal in number to at least one-half the number of said scanning means; said recording means including rotating means for concurrently rotating said recording members along the recording channel of the recording medium.

5. The system according to claim 4, wherein said image scanning device has an array of a plurality of light-responsive elements, and wherein each of said plurality of linear scanning means includes a linear array of a plurality of said light-responsive elements.

6. An image recording system comprising:
(a) an image scanning device having an array of a plurality of linear scanning means arranged for concurrently producing a plurality of sequences of linear scanning signals corresponding to a received image; said plurality of linear scanning means in said scanning device being arranged in odd-numbered and even-numbered groups;
(b) means for concurrently extracting at most all the sequences of linear scanning signals from said plurality of linear scanning means in said scanning device;
(c) circuit means for concurrently receiving the extracted sequences of scanning signals and for concurrently producing a plurality of sequences of recording signals in response to said extracted sequences of scanning signals;
said circuit means including:
first memory means for storing those of said extracted sequences of scanning signals extracted by said extracting means which originate from one of the odd-numbered and even-numbered groups of said plurality of scanning means in said scanning device as first field scanning signals, said first memory means including a plurality of memory blocks each having a predetermined number of memory locations for storing a predetermined number of sequences of scanning signals and operable in such a manner that said predetermined number of sequences of scanning signals are concurrently stored and each of the stored sequences of scanning signals is produced successively in order;
second memory means for storing those of said extracted sequences of scanning signals extracted by said extracting means which originate from the other group of the odd-numbered and even-numbered groups of said plurality of scanning means in said scanning device as second field scanning signals, said second memory means including a plurality of memory blocks each having a predetermined number of memory locations for storing a predetermined number of sequences of scanning signals and operable in such a manner that said predetermined number of sequences of scanning signals are concurrently stored and each of the stored sequences of scanning signals is produced successively in order;

means for controlling said first and second memory means, said controlling means comprising means for causing said first memory means to store those of the extracted sequences of scanning signals which originate from one of the odd-numbered and even-numbered groups of said scanning means and for causing said second memory means to store those of the extracted sequences of scanning signals which originate from the other group, and upon reading of the stored signals for successively causing outputs of each stored sequence of scanning signals in each memory block in the first memory means in order followed by successive outputs of each stored sequence of scanning signals in each memory block in the second memory means in order; and means for receiving and converting the output sequences of scanning signals of said first and second memory means into the sequences of recording signals, said converting means being operable for producing first and second field recording signals in response to said first and second field scanning signals given from said first and second memory means, respectively; wherein said first and second memory means each have an equal number of said memory blocks; and (d) means for concurrently receiving said plurality of sequences of recording signals and for concurrently recording the sequences of recording signals on different corresponding portions of a recording medium; said recording means having at least the same number of recording members for concurrently recording the signals on a recording channel of the recording medium at different portions of the recording medium as the number of memory blocks contained in said first memory means, and said recording means including rotating means for concurrently rotating said recording members along corresponding ones of the recording channels of the recording medium.

7. The system according to claim 6, wherein said image scanning device has an array of a plurality of light-responsive elements, and wherein each of said plurality of linear scanning means includes a linear array of a plurality of said light-responsive elements.

8. An image recording and reproducing system comprising in combination:
(a) image scanning means having an array of a plurality of linear scanning portions arranged for concurrently producing a plurality of sequences of line scanning video signals corresponding to line portions of a received image, said plurality of linear scanning portions being arranged in odd-numbered and even-numbered groups;
(b) means for concurrently extracting, as a first field scanning video signal, sequences of the line scanning video signals from those of said scanning portions which are included in one of the odd-numbered and even-numbered groups, and for subsequently concurrently extracting, as a second field scanning video signal, sequences of the line scanning video signals from those of said scanning portions which are included in the other group;
(c) means for concurrently recording the sequences of the line scanning video signals which constitute said first field scanning video signal on and along corresponding ones of different line video signal recording channels in a first field frame of a recording medium as a first field video signal, and for subsequently concurrently recording the sequences of the line scanning video signals which constitute said second field scanning video signal on and along corresponding ones of different line video signal recording channels in a second field frame of the recording medium as a second field video signal, said recording means having a plurality of recording elements each for recording one sequence of line scanning video signal on the corresponding recording channel as a substantially continuous line video signal;
(d) means for concurrently reproducing the sequences of the line video signals recorded in said first field frame of the recording medium, and for subsequently concurrently reproducing the sequences of the line video signals recorded in said second field frame of the recording medium; and
(e) means for concurrently receiving the sequences of the line video signal reproduced from said first field frame of the recording medium and for putting out each of the received sequences of the line video signals reproduced from the first field frame in a time seriating manner in the order of line numbers in a first field so as to form a substantially continuous standard first field display signal, and for subsequently concurrently receiving the sequences of the line video signals reproduced from said second field frame of the recording means and for putting out each of the received sequences of the line video signals reproduced from the second field frame in a time seriating manner in the order of line numbers in a second field so as to form a substantially continuous standard second field display signal.

9. The system according to claim 8, wherein said scanning means has an even number of said linear scanning portions, and said recording means has said recording elements in number to at least one-half the number of said linear scanning portions.

10. The system according to claims 8 or 9, wherein said scanning means has an array of a plurality of light-responsive elements, and wherein each of said linear scanning portions includes a linear array of a plurality of said light-responsive elements.

11. An image recording system comprising:
(a) an image scanning device having an array of a plurality of linear scanning means arranged for concurrently producing a plurality of sequences of linear scanning signals corresponding to a received image;
(b) means for concurrently extracting at most all the sequences of linear scanning signals from said plurality of linear scanning means in said scanning device;
(c) circuit means for concurrently receiving the extracted sequences of scanning signals and for concurrently producing a plurality of sequences of recording signals in response to said extracted sequences of scanning signals; and (d) means for concurrently receiving said plurality of sequences of recording signals and for concurrently recording the sequences of recording signals on an along a recording channel of a recording medium at different corresponding portions of the recording channel so as to form a substantially continuous field or frame signal along the recording channel.

12. The system according to claim 11, wherein said plurality of linear scanning means in said scanning device are arranged in odd-numbered and even-numbered groups, and said circuit means includes:

means for converting said extracted sequences of scanning signals into said plurality of sequences of recording signals;

means for concurrently accepting those of said extracted sequences of scanning signals extracted by said extracting means which originate from one of the odd-numbered and even-numbered groups of said plurality of scanning means in said scanning device as first field scanning signals;

means for concurrently storing those of said extracted sequences of signals extracted by said extracting means which originate from the other group of the odd-numbered and even-numbered groups of said plurality of scanning means in said scanning device as second field scanning signals; and means for selecting either one of said first field scanning signals accepted through said accepting means and said second field scanning signals stored in said storing means for application to said converting means; wherein said converting means comprises means for producing first and second field recording signals in response to said first and second field scanning signals, respectively.

13. The system according to claim 11, wherein said circuit means includes:

means for converting said extracted sequences of scanning signals into said plurality of sequences of recording signals;

means for concurrently accepting said extracted sequences of scanning signals extracted by said extracting means from said plurality of linear scanning means in said scanning device;

means for concurrently storing said extracted sequences of scanning signals from said accepting means; and means for selecting either one of the scanning signals accepted through said accepting means and the scanning signals stored in said storing means for alternate application to said converting means; wherein said converting means produces first and second field recording signals in response to the signals accepted through said accepting means and the signals stored in said storing means, respectively.

14. The system according to claim 11, wherein said plurality of linear scanning means in said scanning device are arranged in odd-numbered and even-numbered groups, and said circuit means includes:

first memory means for storing those of said extracted sequences of scanning signals extracted by said extracting means which originate from one of the odd-numbered and even-numbered groups of said plurality of scanning means in said scanning device as first field scanning signals, said first memory means including a plurality of memory blocks each having a predetermined number of memory locations for storing a predetermined number of sequences of scanning signals and operable in such a manner that said predetermined number of sequences of scanning signals are concurrently stored and each of the stored sequences of scanning signals is produced successively in order;

second memory means for storing those of said extracted sequences of scanning signals extracted by said extracting means which originate from the other group of the odd-numbered and even-numbered groups of said plurality of scanning means in said scanning device as said second field scanning signals, said second memory means including a plurality of memory blocks each having a predetermined number of memory locations for storing a predetermined number of sequences of scanning signals and operable in such a manner that said predetermined number of sequences of scanning signals are concurrently stored and each of the stored sequences of scanning signals is produced successively in order;

means for controlling said first and second memory means, said controlling means comprising means for causing said first memory means to store those of the extracted sequences of scanning signals which originate from one of the odd-numbered and even-numbered groups of said scanning means and for causing said second memory means to store those of the extracted sequences of scanning signals which originate from the other group, and upon reading of the stored signals for successively causing outputs of each stored sequence of scanning signals in each memory block in the first memory means in order followed by successive outputs of each stored sequence of scanning signals in each memory block in the second memory means in order; and means for receiving and converting the output sequences of scanning signals of said first and second memory means into the sequences of recording signals, said converting means being operable for producing first and second field recording signals in response to said first and second field scanning signals given from said first and second memory means, respectively.

15. The system according to one of claim 11 or 12 or 13 or 14, wherein said image scanning device has an array of a plurality of light-responsive elements, and wherein each of said linear scanning means includes a linear array of a plurality of said light-responsive elements.

16. The system according to one of claim 11 or 12 or 13 or 14, wherein said recording means includes a plurality of recording elements arranged so as to be aligned with the recording channel of the recording medium for concurrently recording the sequences of recording signals on and along the recording channel of the recording medium at different portions of the recording channel so as to form said substantially continuous field or frame signal along the recording channel.

17. The system according to claim 16, wherein said recording means further includes means for supporting said recording elements for concurrent rotation of the elements along the recording channel of the recording medium and means for concurrently rotating said recording elements along the recording channel of the recording medium so as to form said substantially continuous field or frame signal along the recording channel.

* * * * *